US009449467B2

(12) United States Patent
Leupp et al.

(10) Patent No.: US 9,449,467 B2
(45) Date of Patent: Sep. 20, 2016

(54) GAMING SYSTEM AND METHOD PROVIDING A SELECTION GAME ASSOCIATED WITH A PLURALITY OF DIFFERENT SETS OF PICKABLE SELECTIONS

(71) Applicant: IGT, Reno, NV (US)

(72) Inventors: Jon M. Leupp, Orinda, CA (US); Mark C. Nicely, Daly City, CA (US); Timothy L. Isaacson, Hayward, CA (US)

(73) Assignee: IGT, Las Vegas, NV (US)

( * ) Notice: Subject to any disclaimer, the term of this patent is extended or adjusted under 35 U.S.C. 154(b) by 584 days.

(21) Appl. No.: 13/626,674

(22) Filed: Sep. 25, 2012

(65) Prior Publication Data

US 2014/0087809 A1 Mar. 27, 2014

(51) Int. Cl.
*A63F 13/00* (2014.01)
*G07F 17/32* (2006.01)

(52) U.S. Cl.
CPC ......... *G07F 17/3286* (2013.01); *G07F 17/326* (2013.01)

(58) Field of Classification Search
CPC ........................ G07F 17/3267; G07F 17/3262
USPC ................................................ 463/16–20, 29
See application file for complete search history.

(56) References Cited

U.S. PATENT DOCUMENTS

| | | | |
|---|---|---|---|
| 4,448,419 | A | 5/1984 | Telnaes |
| 4,582,324 | A | 4/1986 | Koza et al. |
| 4,624,459 | A | 11/1986 | Kaufman et al. |
| 4,695,053 | A | 9/1987 | Vazquez et al. |
| 4,732,386 | A | 3/1988 | Rayfiel |
| 4,738,451 | A | 4/1988 | Logg |
| 4,756,531 | A | 7/1988 | Dire et al. |
| 5,067,712 | A | 11/1991 | Georgilas et al. |
| 5,092,598 | A | 3/1992 | Kamille |
| 5,205,555 | A | 4/1993 | Hamano |
| 5,342,047 | A | 8/1994 | Heidel |
| 5,407,200 | A | 4/1995 | Zalabak et al. |
| 5,449,173 | A | 9/1995 | Thomas et al. |
| 5,456,465 | A | 10/1995 | Durham |
| 5,498,003 | A | 3/1996 | Gechter et al. |
| 5,501,455 | A | 3/1996 | Hirata et al. |
| 5,524,888 | A | 6/1996 | Heidel |
| 5,536,016 | A | 7/1996 | Thompson |

(Continued)

OTHER PUBLICATIONS

"Mad Scientist," CasinoMan.net, available at http://www.casino-man.net/reviews/slots/mad-scientist-online-slots.asp, printed Sep. 24, 2012 (2 pages).

(Continued)

*Primary Examiner* — Omkar Deodhar
*Assistant Examiner* — Eric M Thomas
(74) *Attorney, Agent, or Firm* — Neal, Gerber & Eisenberg LLP

(57) ABSTRACT

Various embodiments of the present disclosure provide a gaming system and method providing a selection game associated with a plurality of different sets of pickable selections. For a play of the game, the gaming system displays a first set of selections and a second set of selections, and initiates a selection round. If a designated selection of the first set remains unpicked, the gaming system enables the player to pick a selection of the first set. If a designated selection of the second set remains unpicked, the gaming system enables the player to pick a selection of the second set. If the designated ones of the first and second sets of selections have both been picked, the gaming system determines an award based on a total quantity of initiated selection rounds. If not, the gaming system ends the selection round, initiates a subsequent selection round, and repeats the above process.

41 Claims, 17 Drawing Sheets

(56) References Cited

U.S. PATENT DOCUMENTS

| | | | |
|---|---|---|---|
| 5,542,669 | A | 8/1996 | Charron et al. |
| 5,632,485 | A | 5/1997 | Woodland et al. |
| 5,647,798 | A | 7/1997 | Falciglia |
| 5,664,998 | A | 9/1997 | Seelig et al. |
| 5,722,891 | A | 3/1998 | Inoue |
| 5,730,654 | A | 3/1998 | Brown |
| 5,766,074 | A | 6/1998 | Cannon et al. |
| 5,769,716 | A | 6/1998 | Saffari et al. |
| 5,772,509 | A | 6/1998 | Weiss et al. |
| 5,775,692 | A | 7/1998 | Watts et al. |
| 5,788,573 | A | 8/1998 | Baerlocher et al. |
| 5,823,872 | A | 10/1998 | Prather et al. |
| 5,823,873 | A | 10/1998 | Moody et al. |
| 5,823,874 | A | 10/1998 | Adams et al. |
| 5,833,537 | A | 11/1998 | Barrie |
| 5,848,932 | A | 12/1998 | Adams et al. |
| 5,873,781 | A | 2/1999 | Keane et al. |
| 5,882,261 | A | 3/1999 | Adams et al. |
| 5,910,046 | A | 6/1999 | Wada et al. |
| 5,911,418 | A | 6/1999 | Adams et al. |
| 5,919,088 | A | 7/1999 | Weiss et al. |
| 5,927,714 | A | 7/1999 | Kaplan |
| 5,931,467 | A | 8/1999 | Kamille et al. |
| 5,947,820 | A | 9/1999 | Morro et al. |
| 5,951,397 | A | 9/1999 | Dickinson |
| 5,964,463 | A | 10/1999 | Moore et al. |
| 5,967,894 | A | 10/1999 | Kinoshita et al. |
| 5,976,015 | A | 11/1999 | Seelig et al. |
| 5,980,384 | A | 11/1999 | Barrie |
| 5,984,781 | A | 11/1999 | Sunaga |
| 5,996,997 | A | 12/1999 | Kamille et al. |
| 5,997,400 | A | 12/1999 | Seelig et al. |
| 5,997,401 | A | 12/1999 | Crawford |
| 6,001,016 | A | 12/1999 | Walker et al. |
| 6,004,207 | A | 12/1999 | Wilson et al. |
| 6,012,982 | A | 1/2000 | Piechowiak et al. |
| 6,015,346 | A | 1/2000 | Bennett |
| 6,019,369 | A | 2/2000 | Nakagawa et al. |
| 6,033,307 | A | 3/2000 | Vancura et al. |
| 6,056,642 | A | 5/2000 | Bennett |
| 6,059,289 | A | 5/2000 | Vancura et al. |
| 6,062,980 | A | 5/2000 | Luciano |
| 6,071,192 | A | 6/2000 | Weiss |
| 6,089,976 | A | 7/2000 | Schneider et al. |
| 6,089,977 | A | 7/2000 | Bennett |
| 6,089,978 | A | 7/2000 | Adams et al. |
| 6,093,102 | A | 7/2000 | Bennett et al. |
| 6,102,798 | A | 8/2000 | Bennett |
| 6,113,098 | A | 9/2000 | Adams et al. |
| 6,113,102 | A | 9/2000 | Marks et al. |
| 6,117,007 | A | 9/2000 | Matsuyama et al. |
| 6,117,008 | A | 9/2000 | Machiguchi et al. |
| 6,120,031 | A | 9/2000 | Adams et al. |
| 6,126,542 | A | 10/2000 | Fier |
| 6,126,544 | A | 10/2000 | Kojima |
| 6,126,547 | A | 10/2000 | Ishimoto |
| 6,135,884 | A | 10/2000 | Hedrick et al. |
| 6,135,885 | A | 10/2000 | Lermusiaux |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,273 | A | 11/2000 | Olsen |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura et al. |
| 6,159,098 | A | 12/2000 | Slomiany et al. |
| 6,162,121 | A | 12/2000 | Morro et al. |
| 6,164,652 | A | 12/2000 | Lauretta et al. |
| 6,168,520 | B1 | 1/2001 | Baerlocher et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,203,429 | B1 | 3/2001 | Demar et al. |
| 6,210,279 | B1 | 4/2001 | Dickinson |
| 6,224,483 | B1 | 5/2001 | Mayeroff |
| 6,227,969 | B1 | 5/2001 | Yoseloff |
| 6,227,971 | B1 | 5/2001 | Weiss |
| 6,227,972 | B1 | 5/2001 | Walker et al. |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,287 | B1 | 5/2001 | Komori et al. |
| 6,261,177 | B1 | 7/2001 | Bennett |
| 6,270,412 | B1 | 8/2001 | Crawford et al. |
| 6,283,855 | B1 | 9/2001 | Bingham |
| 6,290,600 | B1 | 9/2001 | Glasson |
| 6,296,568 | B1 | 10/2001 | Tracy |
| 6,302,790 | B1 | 10/2001 | Brossard |
| 6,309,300 | B1 | 10/2001 | Glavich |
| 6,312,334 | B1 | 11/2001 | Yoseloff |
| 6,315,291 | B1 | 11/2001 | Moody |
| 6,315,664 | B1 | 11/2001 | Baerlocher et al. |
| 6,319,124 | B1 | 11/2001 | Baerlocher et al. |
| 6,322,039 | B1 | 11/2001 | De Luccia |
| 6,328,649 | B1 | 12/2001 | Randall et al. |
| 6,334,814 | B1 | 1/2002 | Adams |
| 6,336,860 | B1 | 1/2002 | Webb |
| 6,338,678 | B1 | 1/2002 | Seelig et al. |
| 6,343,988 | B1 | 2/2002 | Walker et al. |
| 6,346,043 | B1 | 2/2002 | Colin et al. |
| 6,347,795 | B1 | 2/2002 | De Leljer |
| 6,347,996 | B1 | 2/2002 | Gilmore et al. |
| 6,364,313 | B1 | 4/2002 | Moody |
| 6,364,766 | B1 | 4/2002 | Anderson et al. |
| 6,364,767 | B1 | 4/2002 | Brossard et al. |
| 6,375,187 | B1 | 4/2002 | Baerlocher |
| 6,375,567 | B1 | 4/2002 | Acres |
| 6,394,902 | B1 | 5/2002 | Glavich et al. |
| 6,398,218 | B1 | 6/2002 | Vancura |
| 6,398,644 | B1 | 6/2002 | Perrie et al. |
| 6,406,369 | B1 | 6/2002 | Baerlocher et al. |
| 6,413,160 | B1 | 7/2002 | Vancura |
| 6,413,161 | B1 | 7/2002 | Baerlocher et al. |
| 6,413,162 | B1 | 7/2002 | Baerlocher et al. |
| 6,428,412 | B1 | 8/2002 | Anderson et al. |
| 6,439,995 | B1 * | 8/2002 | Hughs-Baird ...... G07F 17/3267 273/138.1 |
| 6,443,837 | B1 | 9/2002 | Jaffe et al. |
| 6,450,883 | B1 | 9/2002 | O'Halloran |
| 6,450,884 | B1 | 9/2002 | Seelig et al. |
| 6,454,651 | B1 | 9/2002 | Yoseloff |
| 6,461,241 | B1 | 10/2002 | Webb et al. |
| 6,464,582 | B1 | 10/2002 | Baerlocher et al. |
| 6,482,089 | B2 | 11/2002 | DeMar et al. |
| 6,485,367 | B1 | 11/2002 | Joshi |
| 6,491,584 | B2 | 12/2002 | Graham et al. |
| 6,494,785 | B1 | 12/2002 | Gerrard et al. |
| 6,506,117 | B2 | 1/2003 | DeMar et al. |
| 6,506,118 | B1 * | 1/2003 | Baerlocher ......... G07F 17/3244 463/16 |
| 6,508,707 | B2 | 1/2003 | DeMar et al. |
| 6,511,375 | B1 | 1/2003 | Kaminkow |
| 6,514,141 | B1 | 2/2003 | Kaminkow et al. |
| 6,547,242 | B1 | 4/2003 | Sugiyama et al. |
| 6,558,254 | B2 | 5/2003 | Baelocher et al. |
| 6,561,899 | B2 | 5/2003 | Vancura |
| 6,561,902 | B1 | 5/2003 | Walker et al. |
| 6,565,436 | B1 | 5/2003 | Baerlocher |
| 6,569,015 | B1 | 5/2003 | Baerlocher et al. |
| 6,569,016 | B1 | 5/2003 | Baerlocher |
| 6,572,472 | B1 | 6/2003 | Glavich |
| 6,575,830 | B2 | 6/2003 | Baerlocher et al. |
| 6,582,307 | B2 | 6/2003 | Webb |
| 6,585,591 | B1 | 7/2003 | Baerlocher et al. |
| 6,595,854 | B2 | 7/2003 | Hughs-Baird et al. |
| 6,599,185 | B1 | 7/2003 | Kaminkow et al. |
| 6,599,192 | B1 | 7/2003 | Baerlocher et al. |
| 6,602,137 | B2 | 8/2003 | Kaminkow et al. |
| 6,605,002 | B2 | 8/2003 | Baerlocher |
| 6,607,437 | B2 | 8/2003 | Casey et al. |

(56) References Cited

U.S. PATENT DOCUMENTS 6,607,438 B2 8/2003 Baerlocher et al.
6,609,971 B2 8/2003 Vancura
6,632,141 B2 10/2003 Webb et al.
6,634,943 B1 10/2003 Baerlocher
6,676,516 B2 1/2004 Baerlocher et al.
6,692,356 B2 2/2004 Baerlocher et al.
6,722,981 B2 4/2004 Kaminkow et al.
6,722,982 B2 4/2004 Kaminkow et al.
6,733,386 B2 5/2004 Cuddy et al.
6,749,504 B2 6/2004 Hughs-Baird
6,767,283 B1 7/2004 Weiss
6,769,983 B2 8/2004 Slomiany
6,776,711 B1 8/2004 Baerlocher
6,780,107 B2 8/2004 Baerlocher et al.
6,780,110 B2 8/2004 Baerlocher et al.
6,783,455 B2 8/2004 Glavich
6,783,457 B2 8/2004 Hughs-Baird et al.
6,786,819 B2 9/2004 Baerlocher et al.
6,796,901 B2 9/2004 Baerlocher
6,817,944 B2 11/2004 Kaminkow et al.
6,832,959 B2 12/2004 Baerlocher
6,843,721 B2 1/2005 Vancura
6,843,722 B2 1/2005 Webb
6,852,028 B2 2/2005 Vancura
6,863,606 B1 3/2005 Berg et al.
6,875,108 B1 4/2005 Hughs-Baird
6,877,745 B1 4/2005 Walker et al.
6,899,620 B2 5/2005 Kaminkow et al.
6,913,533 B2 7/2005 Cuddy et al.
6,918,834 B2 7/2005 Vancura
6,929,545 B2 8/2005 Vancura
6,932,701 B2 8/2005 Glavich et al.
6,939,226 B1 9/2005 Joshi
6,958,013 B2 10/2005 Miereau et al.
6,966,833 B2 11/2005 Kaminkow et al.
6,991,543 B2 1/2006 Joshi
7,001,278 B2 2/2006 Maya et al.
7,004,834 B2 2/2006 Walker et al.
7,037,191 B2 5/2006 Rodgers et al.
7,040,984 B2 5/2006 Mead
7,056,214 B2 6/2006 Miereau et al.
7,104,888 B2 9/2006 Miereau et al.
7,112,137 B2 9/2006 Baerlocher et al.
7,121,942 B2 10/2006 Baerlocher
7,131,908 B2 11/2006 Baerlocher
7,153,205 B2 12/2006 Baerlocher
7,160,186 B2 1/2007 Cuddy et al.
7,160,188 B2 1/2007 Kaminkow et al.
7,160,190 B2 1/2007 Baerlocher et al.
7,172,506 B2 2/2007 Baerlocher et al.
7,182,689 B2 2/2007 Hughs-Baird et al.
7,235,009 B2 6/2007 Baerlocher
7,235,011 B2 6/2007 Randall et al.
7,247,096 B2 7/2007 Vancura
7,264,545 B2 9/2007 Maya et al.
7,273,415 B2 9/2007 Cregan et al.
7,278,919 B2 10/2007 Souza et al.
7,300,348 B2 11/2007 Kaminkow et al.
7,303,469 B2 12/2007 Kaminkow
7,306,519 B2 12/2007 Baerlocher
7,314,409 B2 1/2008 Maya et al.
7,316,609 B2 1/2008 Dunn et al.
7,331,865 B2 2/2008 Baerlocher et al.
7,338,367 B2 3/2008 Kaminkow et al.
7,338,369 B2 3/2008 Mierau et al.
7,351,141 B2 4/2008 Rodgers et al.
7,371,169 B2 5/2008 Baerlocher
7,371,174 B2 5/2008 Baerlocher
7,377,849 B2 5/2008 Baerlocher et al.
7,399,227 B2 7/2008 Michaelson et al.
7,399,228 B2 7/2008 Baerlocher
7,402,103 B2 7/2008 Baerlocher
7,413,510 B2 8/2008 Schlegel et al.
7,470,186 B2 12/2008 Cannon
7,494,411 B2 2/2009 Baerlocher
7,513,827 B2 4/2009 Baerlocher
7,547,252 B2 6/2009 Peterson et al.
7,566,267 B2 7/2009 Vancura
7,566,271 B2 7/2009 Hostetler et al.
7,568,973 B2 8/2009 Iddings et al.
7,578,736 B2 8/2009 Baerlocher et al.
7,585,218 B2 9/2009 Mead et al.
7,585,223 B2 9/2009 Iddings et al.
7,591,722 B2 9/2009 Baerlocher et al.
7,591,723 B2 9/2009 Cregan et al.
7,601,058 B2 10/2009 Slomiany
7,614,947 B2 11/2009 Baerlocher et al.
7,682,241 B2 3/2010 Baerlocher
7,690,981 B2 4/2010 Ching et al.
7,722,463 B2 5/2010 Maya et al.
7,726,655 B2 6/2010 Walker et al.
7,744,454 B2 6/2010 Mierau et al.
7,749,070 B2 7/2010 Baerlocher et al.
7,780,523 B2 8/2010 Baerlocher et al.
7,785,188 B2 8/2010 Cannon
7,806,760 B2 10/2010 Baerlocher
7,824,263 B2 11/2010 Baerlocher
7,833,095 B2 11/2010 Cuddy et al.
7,837,554 B2 11/2010 Kaminkow et al.
7,841,939 B2 11/2010 Baerlocher et al.
7,867,074 B2 1/2011 Gerrard et al.
7,874,912 B2 1/2011 Cregan et al.
7,887,409 B2 2/2011 Baerlocher et al.
7,901,282 B2 3/2011 Cannon
7,905,778 B2 3/2011 Breckner et al.
7,914,373 B2 3/2011 Webb et al.
7,963,841 B2 6/2011 Baerlocher et al.
7,976,382 B2 7/2011 Benbrahim
2002/0025844 A1 2/2002 Casey et al.
2002/0045475 A1 4/2002 Glavich et al.
2002/0049084 A1 4/2002 Hughs-Baird et al.
2002/0072402 A1 6/2002 Baerlocher
2002/0107068 A1 8/2002 Baerlocher et al.
2002/0142822 A1 10/2002 Baerlocher et al.
2002/0151350 A1 10/2002 Baerlocher et al.
2002/0155883 A1 10/2002 Baerlocher
2003/0013514 A1* 1/2003 Cregan .................. G07F 17/32 463/20
2003/0040355 A1 2/2003 Baerlocher
2003/0045344 A1 3/2003 Webb et al.
2003/0045348 A1 3/2003 Palmer et al.
2003/0045350 A1* 3/2003 Baerlocher ............. G07F 17/32 463/25
2003/0060266 A1 3/2003 Baerlocher
2003/0064795 A1 4/2003 Baerlocher et al.
2004/0005919 A1 1/2004 Walker et al.
2005/0020351 A1 1/2005 Baerlocher et al.
2005/0054435 A1 3/2005 Rodgers et al.
2005/0192081 A1 9/2005 Marks et al.
2006/0030401 A1 2/2006 Mead et al.
2006/0052157 A1 3/2006 Walker et al.
2006/0183528 A1 8/2006 Rodgers et al.
2007/0060321 A1 3/2007 Vasquez et al.
2007/0117606 A1 5/2007 Baerlocher et al.
2007/0149267 A1 6/2007 Ross et al.
2007/0184887 A1 8/2007 Cannon
2007/0191088 A1 8/2007 Breckner et al.
2008/0020846 A1 1/2008 Vasquez et al.
2008/0146321 A1 6/2008 Parente
2008/0188287 A1 8/2008 Schlegel et al.
2008/0254894 A1 10/2008 Michaelson et al.
2009/0104959 A1 4/2009 Caputo et al.
2009/0111560 A1 4/2009 Davis et al.
2009/0253492 A1 10/2009 Caputo et al.
2010/0004044 A1 1/2010 Slomiany
2010/0048282 A1 2/2010 Nicely et al.
2010/0120505 A1 5/2010 Caputo et al.
2011/0183750 A1 7/2011 Cregan et al.

OTHER PUBLICATIONS

"IGT—The Hangover," Innovate Gaming, available at http://www.innovategaming.com/igt-the-hangover, printed Sep. 24, 2012 (4 pages).

(56) References Cited

OTHER PUBLICATIONS

"Mr. AC Casino: Bonuses mount in Breakfast at Tiffany's slots," Press of Atlantic City, available at http://www.pressofatlanticcity.com/ats/gambling/mr-ac-casino-bonuses-mount-in-breakfast-at-tiffany-s/article__95cd8f3c-3a8f-5c78-92ca-64fcd99c1a23.html, printed Sep. 24, 2012 (3 pages).

"Clue—Classic Detective Game," Official Rules, available at http://www.pressofatlanticcity.com/ats/gambling/mr-ac-casino-bonuses-mount-in-breakfast-at-tiffany-s/article__95cd8f3c-3a8f-5c78-92ca-64fcd99c1a23.html, printed Sep. 24, 2012 (4 pages).

* cited by examiner

GAMING SYSTEM AND METHOD PROVIDING A SELECTION GAME ASSOCIATED WITH A PLURALITY OF DIFFERENT SETS OF PICKABLE SELECTIONS

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent the or records, but otherwise reserves all copyright rights whatsoever.

BACKGROUND

Gaming machines that provide players awards in primary or base games are well known. These gaming machines generally require a player to place a wager to activate a play of the primary game. For many of these gaming machines, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in higher awards being provided when they do occur.

For such known gaming machines, an amount of a wager placed on a primary game by a player may vary. For instance, a gaming machine may enable a player to wager a minimum quantity of credits, such as one credit (e.g., one cent, nickel, dime, quarter, or dollar), up to a maximum quantity of credits, such as five credits. The gaming machine may enable the player to place this wager a single time or multiple times for a single play of the primary game. For instance, a gaming machine configured to operate a slot game may have one or more paylines, and the gaming machine may enable a player to place a wager on each of the paylines for a single play of the slot game. Thus, it is known that a gaming machine, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Bonus or secondary games are also known in gaming machines. Such gaming machines usually provide an award to a player for a play of one such bonus game in addition to any awards provided for any plays of any primary games. Bonus games usually do not require an additional wager to be placed by the player to be initiated. Bonus games are typically initiated or triggered upon an occurrence of a designated triggering symbol or designated triggering symbol combination in the primary game. For instance, a gaming machine may initiate or trigger a bonus game when a bonus symbol occurs on the payline on the third reel of a three reel slot machine. The gaming machine generally indicates when a bonus game is initiated or triggered through one or more visual and/or audio output devices, such as the reels, lights, speakers, display screens, etc. Part of the enjoyment and excitement of playing certain gaming machines is the initiation or triggering of a bonus game, even before the player knows an amount of a bonus award won via the bonus game.

Many known gaming systems employ a variety of different selection-type games as bonus games. Upon an initiation of certain of these known selection-type bonus games, the gaming system displays a plurality of selections or indicators, such as numbers; letters; or graphical representations of people, places, or things, and enables a player to pick one of the displayed selections. If the picked selection is associated with an award, the gaming system provides the player that award. In certain selection-type games, if the picked selection is associated with a bonus game terminator instead of or in addition to an award, the gaming system terminates the selection-type game. In other selection-type games, the gaming system provides the player with a limited quantity of picks (such as five picks), and enables the player to use each pick to select one of the displayed selections. In further selection-type games, each selection has a corresponding matching selection. In these selection-type games, the gaming system enables the player to select pairs of selections until the player selects a designated quantity of matching pairs of selections.

One problem with certain known selection-type games is that such games tend to have a relatively low volatility, especially if the available awards do not change from play to play. Another problem with certain known selection-type games is that such games provide a single goal for players to achieve: accumulate and use as many picks as possible.

There is a continuing need to provide new, exciting, and engaging bonus games and, in particular, new, exciting, and engaging variations of selection-type bonus games, to increase player enjoyment and excitement.

SUMMARY

Various embodiments of the present disclosure provide a gaming system and method providing one of a plurality of bonus games each associated with at least one same winnable award. In certain embodiments, the gaming system is configured to operate a primary wagering game and a plurality of different bonus games. Each of the bonus games is associated with a set of a plurality of awards. At least two of the sets of awards are different, and each set of awards includes at least one same award, such as a jackpot award. One of the bonus games is a selection game associated with a plurality of different sets of pickable selections. Upon an occurrence of a bonus triggering event associated with the primary wagering game, the gaming system selects one of the bonus games and initiates a play of the selected bonus game. Following play of the selected bonus game, the gaming system determines one of the awards of the set of awards associated with the selected bonus game, and provides the determined award to the player.

In one embodiment in which the gaming system selects the selection game upon the occurrence of the bonus triggering event, the gaming system simultaneously displays a first set of a plurality of selections and a second set of a plurality of selections. The gaming system initiates a selection round. For the selection round, if a designated one of the first set of selections remains unpicked, the gaming system enables the player to pick one of the displayed selections of the first set of selections. Similarly, if a designated one of the second set of selections remains unpicked, the gaming system enables the player to pick one of the displayed selections of the second set of selections. After receiving any player picks, if the designated one of the first set of selections and the designated one of the second set of selections have both been picked, the gaming system determines one of the awards associated with the selection game based on a total quantity of initiated selection rounds. If, on the other hand, at least one of the designated one of the first set of selections and the designated one of the second set of selections remains unpicked, the gaming system ends the selection round, initiates a subsequent selection round, and repeats the above process for the subsequent selection round. The gaming system provides the determined awards to the player.

In another embodiment in which the gaming system selects the selection game upon the occurrence of the bonus triggering event, if the designated one of the first set of selections and the designated one of the second set of selections have both been picked, the gaming system determines one of the awards associated with the selection game based on a total quantity of picks made by the player rather than based on the total quantity of initiated selection rounds.

It should thus be appreciated that the gaming system of the present disclosure is configured to provide new, exciting, and engaging variations of a selection game, thereby increasing player enjoyment and entertainment.

Additional features and advantages are described herein, and will be apparent from, the following Detailed Description and the Figures.

DETAILED DESCRIPTION

Figure 1:
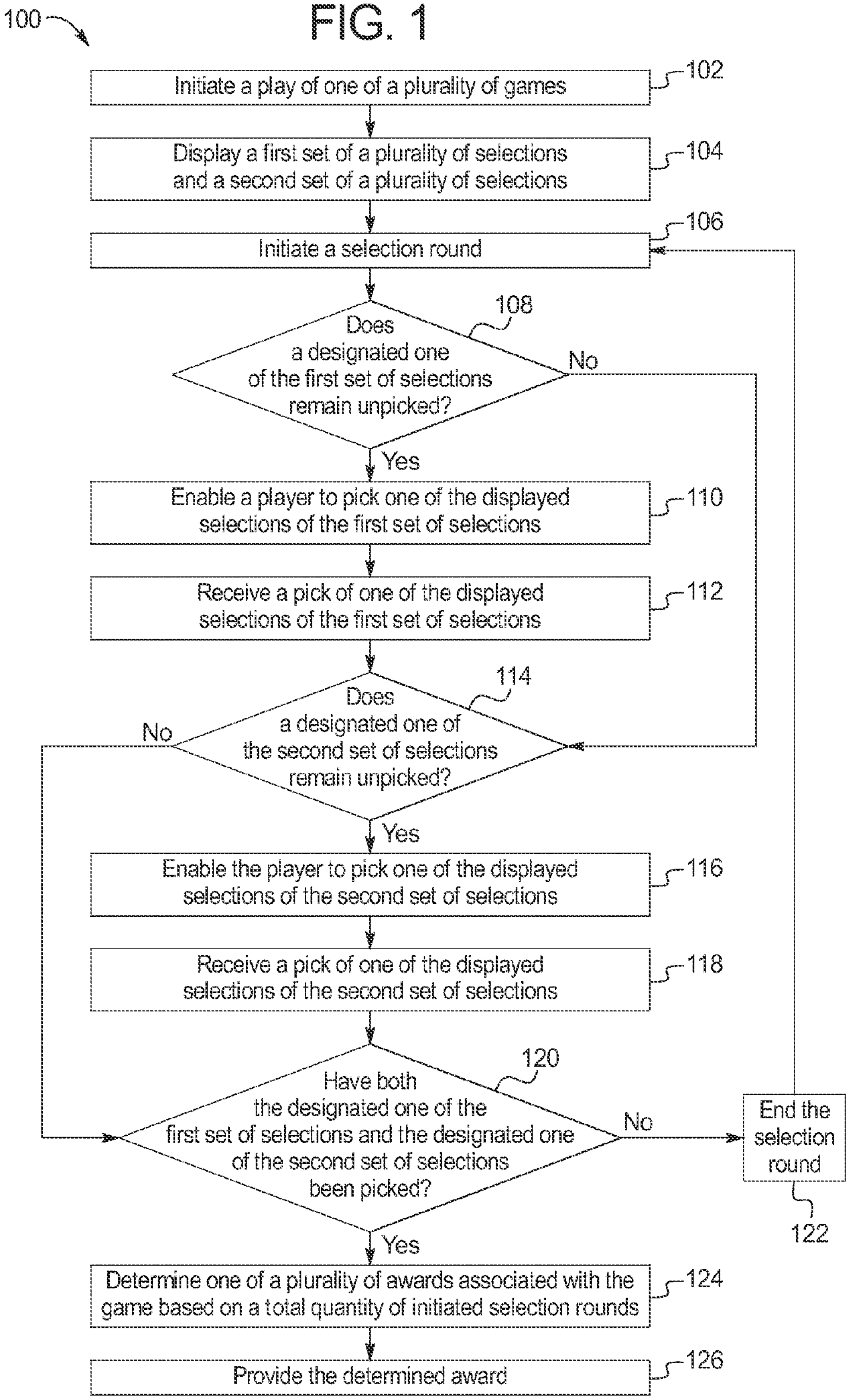
FIG. 1 is a flowchart illustrating an example method of operating the gaming system of the present disclosure.

A Plurality of Bonus Games Each Associated with at Least One Same Winnable Award Various embodiments of the present disclosure provide a gaming system and method providing one of a plurality of bonus games each associated with at least one same winnable award. While the games are referred to as bonus games in the embodiments described below, it should be appreciated that the games may additionally or alternatively be employed as base or primary games.

The gaming system of the present disclosure is configured to operate one or more primary wagering games upon a wager by a player and one of a plurality of bonus games upon an occurrence of a bonus game triggering event. It should be appreciated that the primary wagering game(s) may be any suitable type of game, such as (but not limited to) a slot or spinning reel type game; a card game such as draw poker, multi-hand draw poker, blackjack, or baccarat; a keno game; or a bingo game. It should also be appreciated that the bonus games may be any suitable type or types of games, such as (but not limited to) slot or spinning reel type games, card games, keno games, bingo games, selection games, spinning wheel type games, and the like.

In various embodiments each of the bonus games is a different type of game (e.g., one of the bonus games is a slot type game, another of the bonus games is a selection game, another of the bonus games is a spinning wheel type game, and so on). In certain embodiments, at least two, but fewer than all, of the bonus games are different types of games (e.g., two of the bonus games are selection games, while another of the bonus games is a slot type game). In other embodiments, all of the bonus games are a same type of game (e.g., all of the bonus games are selection games).

Each of the bonus games is associated with a set of a plurality of awards. For a play of a given bonus game, the gaming system determines one of the awards of the set of awards associated with that bonus game to provide to the player. Each of the sets of awards includes at least one same award. For instance, each of the sets of awards includes a progressive award such that, regardless of which of the bonus games is triggered, the player has an opportunity to win the progressive award. In various embodiments, each bonus game is associated with a different set of awards. In certain embodiments, at least two, but fewer than all, of the bonus games are associated with different sets of awards. In other embodiments, all of the bonus games are associated with the same set of awards.

It should be appreciated that the sets of awards may include any suitable quantity of any suitable types of awards, such as, but not limited to, one or more of: (a) monetary credits or currency; (b) non-monetary credits or currency; (c) a modifier such as a multiplier used to modify one or more awards; (d) one or more free plays of a game (such as one or more free spins of a spinning reel type game); (e) one or more plays of one or more bonus games (such as a free spin of an award wheel); (f) one or more lottery based awards, such as lottery or drawing tickets; (g) a wager match for one or more plays of the primary wagering game; (h) an increase in the average expected payback percentage of the bonus game and/or the primary wagering game for one or more plays; (i) one or more comps, such as a free dinner or a free night's stay at a hotel; (j) one or more bonus or promotional credits usable for online play; (k) a lump sum of player tracking points or credits; (l) a multiplier for player tracking points or credits; (m) an increase in a membership or player tracking level; (n) coupons or promotions usable within the gaming establishment and/or outside of the gaming establishment (e.g., a 20% off coupon for use at a convenience store or a promotional code providing a deposit match for use in association with an online casino); (o) an access code usable to unlock content on the internee; (p) a progressive jackpot or other progressive award; (q) a high value product such as a free car; and (r) a low value product such as a free teddy bear.

As noted above, upon an occurrence of the bonus triggering event, the gaming system selects one of the bonus games and provides the player a play of the selected bonus game. It should be appreciated that any suitable bonus triggering event may be employed. In various embodiments, the bonus triggering event is: (a) based on an outcome of a play of the primary wagering game (e.g., a designated symbol or a designated symbol combination); (b) based on coin-in or coin-out; (c) based on time; (d) based on a random determination; (e) based on a retriggering event that occurs during play of a bonus game; and/or (f) based on any other suitable factor(s)

It should be appreciated that when the bonus triggering event occurs, the gaming system selects one of the bonus games in any suitable manner. In various embodiments, the gaming system selects one of the bonus games based on: (a) a random determination; (b) a predetermined order or criteria; (c) player selection; (d) an outcome or outcomes of a play or plays of the primary wagering game; (e) the player's wager; (f) coin-in and/or coin-out; (g) time (such as time of day or time of year); (h) which of a plurality of different bonus triggering events occurred; (i) based on state of game-based or player-based persistent data (e.g., the gaming system selects a bonus game that was previously terminated mid-play); and/or (j) any other suitable factor(s).

Selection Game Associated with a Plurality of Different Sets of Pickable Selections In certain embodiments, one of the bonus games described above is a selection game associated with a plurality of different sets of pickable selections. Although the selection game is referred to as a bonus game in the embodiments described below, it should be appreciated that the selection game may additionally or alternatively be employed as a base or primary game in other embodiments. Moreover, while certain of the awards described below are amounts of monetary credits or currency, one or more of such awards may include non-monetary credits, promotional credits, and/or player tracking points or credits. It should be appreciated that the player's credit balance and any wagers placed by the player may also be provided in non-monetary credits, promotional credits, and/or player tracking points or credits FIG. 1 illustrates a flowchart of an example process or method 100 of operating an embodiment of the gaming system of the present disclosure. In various embodiments, process 100 is represented by a set of instructions stored in one or more memories and executed by one or more processors. Although process 100 is described with reference to the flowchart shown in FIG. 1, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In this example, as described in detail above, the gaming system is configured to operate a plurality of bonus games, one of which is a selection game. In this example, upon an occurrence of the bonus triggering event, the gaming system determines to provide a play of the selection game. Accordingly, the gaming system initiates a play of the selection game, as indicated by block 102. The gaining system displays a first set of a plurality of selections and a second set of a plurality of selections, as indicated by block 104. The gaming system initiates a selection round, as indicated by block 106.

The gaming system determines whether a designated one of the first set of selections remains unpicked, as indicated by diamond 108. If the gaming system determines that the designated one of the first set of selections has been picked (i.e., does not remain unpicked), process 100 proceeds to diamond 114, described below. If, on the other hand, the gaming system determines that the designated one of the first set of selections remains unpicked, the gaming system enables a player to pick one of the displayed selections of the first set of selections, as indicated by block 110, and receives a pick of one of the displayed selections of the first set of selections from the player, as indicated by block 112.

The gaming system determines whether a designated one of the second set of selections remains unpicked, as indicated by diamond 114. If the gaming system determines that the designated one of the second set of selections has been picked (i.e., does not remain unpicked), process 100 proceeds to diamond 120, described below. If, on the other hand, the gaming system determines that the designated one of the second set of selections remains unpicked, the gaming system enables the player to pick one of the displayed selections of the second set of selections, as indicated by block 116, and receives a pick of one of the displayed selections of the second set of selections from the player, as indicated by block 118.

The gaming system determines whether the designated one of the first set of selections and the designated one of the second set of selections have both been picked, as indicated by diamond 120. If the gaming system determines that at least one of the designated one of the first set of selections and the designated one of the second set of selections has not been picked (i.e., that the designated one of the first set of selections and the designated one of the second set of selections have not both been picked), the gaming system ends the selection round, as indicated by block 122, and process 100 returns to block 106. If, on the other hand, the gaming system determines that the designated one of the first set of selections and the designated one of the second set of selections have both been picked, the gaming system determines one of the awards of a set of awards associated with the selection game based on a total quantity of initiated selection rounds, as indicated by block 124. The gaming system provides the determined award to the player, as indicated by block 126.

FIGS. 2A, 2B, 2C, 20, 2E, 2F, 2G, 2H, and 2I illustrate screen shots of an embodiment of the gaming system of the present disclosure providing a play of such an example of the selection game. Generally, upon initiation of the play of the selection game in this embodiment, the gaming system simultaneously displays a first set of a plurality of selections in a first selection set display area and a second set of a plurality of selections in a second selection set display area. The gaming system initiates a selection round and, for the selection round, enables the player to pick one of the displayed selections of the first set of selections and one of the displayed selections of the second set of selections. If, after receiving the player's picks, the gaming system determines that at least one of a designated one of the first set of selections and a designated one of the second set of selections remains unpicked, the gaming system ends the selection round and initiates another selection round. In this embodiment, the gaming system removes any picked selections that are not designated selections from their respective selection set display areas.

In the subsequent selection round, if the designated one of the first set of selections remains unpicked (i.e., was not picked in any preceding selection round), the gaming system enables the player to select another one of the displayed selections of the first set of selections. Similarly, if the designated one of the second set of selections remains unpicked (i.e., was not picked in any preceding selection round), the gaming system enables the player to select another one of the displayed selections of the second set of selections. After receiving the player's picks, the gaming system again determines whether at least one of the designated one of the first set of selections and the designated one of the second set of selections remains unpicked. If so, the gaming system ends the selection round, removes any picked non-designated selections from their respective selection set display areas, and initiates another selection round. It should be appreciated that, in this embodiment, the gaming system enables the player to pick, at most, a single displayed selection from each set of selections per selection round.

If the gaming system determines that the designated one of the first set of selections and the designated one of the second set of selections have both been picked, the gaming system determines one of a set of awards associated with the selection game based on a total quantity of initiated selection rounds. In this embodiment, the lower the total quantity of initiated selection rounds, the more valuable the award. Accordingly, it should be appreciated that, in this embodiment, the gaming system incentivizes the player to pick the designated selections in as few selection rounds as possible to maximize the player's award. The set of awards associated with the selection game in this embodiment and the total quantities of initiated selection rounds associated with the respective awards are listed in Table 1 below,

TABLE 1

Set of Awards Associated with Example Selection Game

| Total Quantity of Initiated Selection Rounds | Award |
| --- | --- |
| One | Progressive Award #1 |
| Two | Progressive Award #2 |
| Three | 20 Free Spins with a 10X Multiplier |
| Four | 20 Free Spins with a 5X Multiplier |
| Five | 20 Free Spins with a 3X Multiplier |
| Six | 20 Free Spins with a 2X Multiplier |

Figure 2A:
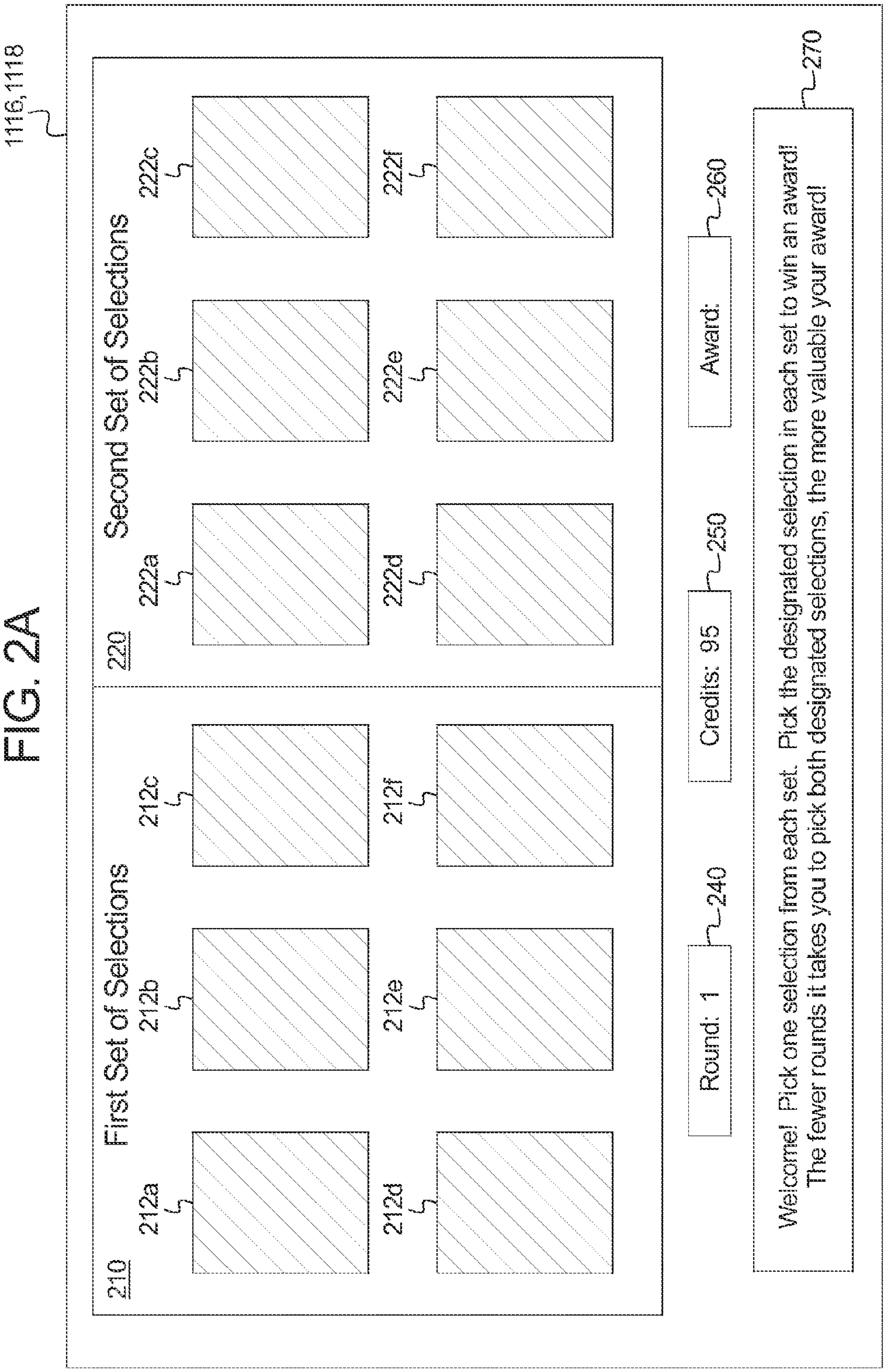
FIGS. 2A, 2B, 2C, 2D, 2E, 2F, 2G, 2H, and 2I illustrate screen shots of one embodiment of the gaming system of the present disclosure operating one example of the selection game of the present disclosure in which the gaming system determines an award to provide to the player based on a total quantity of initiated selection rounds.

Turning to FIG. 2A, upon initiation of a play of the selection game in this illustrated example, the gaming system displays, such as on a display device 1116 or 1118 (described below), a first selection set display area 210 and a second selection set display area 220. The gaming system simultaneously displays a first set of a plurality of selections 212*a*, 212*b*, 212*c*, 212*d*, 212*e*, and 212*f* in first selection set display area 210 and a second set of a plurality of selections 222*a*, 222*b*, 222*c*, 222*d*, 222*e*, and 222*f* in second selection set display area 220. While each set of selections includes six selections in this example, it should be appreciated that each set of selections may include any suitable quantity of selections. It should also be appreciated that, in other embodiments, the gaming system displays the sets of selections sequentially rather than simultaneously (e.g., displays the first set and enables the player to pick one of the selections of the first set, as explained below, then displays the second set and enables the player to pick one of the selections of the second set).

The gaming system also displays a selection round display 240, which displays the current selection round; a credit display 250, which displays the player's credit balance; an award display 260, which displays any awards provided to the player for the play of the selection game; and a message display 270, which displays messages or indications before, during, or after play of the selection game. While in this illustrated example the gaming system indicates any credit awards provided to the player in the form of amounts of credits, it should be appreciated that such indications may alternatively or additionally be made in the form of amounts of currency.

In this example, one of the first set of selections is a designated selection and one of the second set of selections is a designated selection, and the gaming system randomly determines which of the first set of selections and which of the second set of selections are the designated selections. It should be appreciated that, in other embodiments, the gaming system determines which of the first set of selections and which of the second set of selections are the designated selections based on: (a) a probability distribution; (b) a predetermined criteria or order; (c) an outcome or outcomes of the primary wagering game; (d) the player's wager; (e) a player tracking status or level of the player; (f) player coin-in and/or coin-out; (g) time (such as time of day or time of year); and/or (h) any other suitable factor(s). In other embodiments, a plurality of the selections of one or more of the sets of selections are designated selections. It should be appreciated that any suitable quantity of the selections of a given set of selections may be designated selections, and that the gaming system may determine how many selections of that set of selections are designated selections based on: (a) a random determination; (b) a probability distribution; (c) a predetermined criteria or order; (d) an outcome or outcomes of the primary wagering game; (e) the player's wager; (f) a player tracking status or level of the player; (g) player coin-in and/or coin-out; (h) time (such as time of day or time of year); and/or (i) any other suitable factor(s).

In this example, the gaming system does not provide any indications or hints as to which of the displayed selections are the designated selections. In other embodiments, however, the gaming system provides one or more indications or hints as to which of the displayed selections are the designated selections. In one example, the gaming system provides an indication or a hint as to which of the displayed selections are the designated selections upon placement of an additional wager or upon payment of a fee by the player. In another example, the gaming system provides an indication or a hint as to which of the displayed selections are the designated selections if the player's player tracking level or status is at least a designated level or status. In a further example, the gaming system provides an indication or a hint as to which of the displayed selections are the designated selections if the player has achieved a designated outcome during play of the primary wagering game (e.g., the gaming system enables the player to earn indications or hints via play of the primary wagering game to use during play of the selection game). It should be appreciated that the gaming system may provide such indications or hints upon the occurrence of any suitable event(s) and/or based on any suitable factor(s).

Returning to FIG. 2A, upon initiation of the play of the selection game, the gaming system initiates a first selection round, and displays "1" in selection round display 240 to indicate that the current selection round is the first selection round. The gaming system enables the player to pick one of the displayed selections of the first set of selections and one of the displayed selections of the second set of selections. The gaming system displays the following message in message display 270: "WELCOME! PICK ONE SELECTION FROM EACH SET. PICK THE DESIGNATED SELECTION IN EACH SET TO WIN AN AWARD! THE FEWER ROUNDS IT TAKES YOU TO PICK BOTH DESIGNATED SELECTIONS, THE MORE VALUABLE YOUR AWARD!"

Figure 2B:
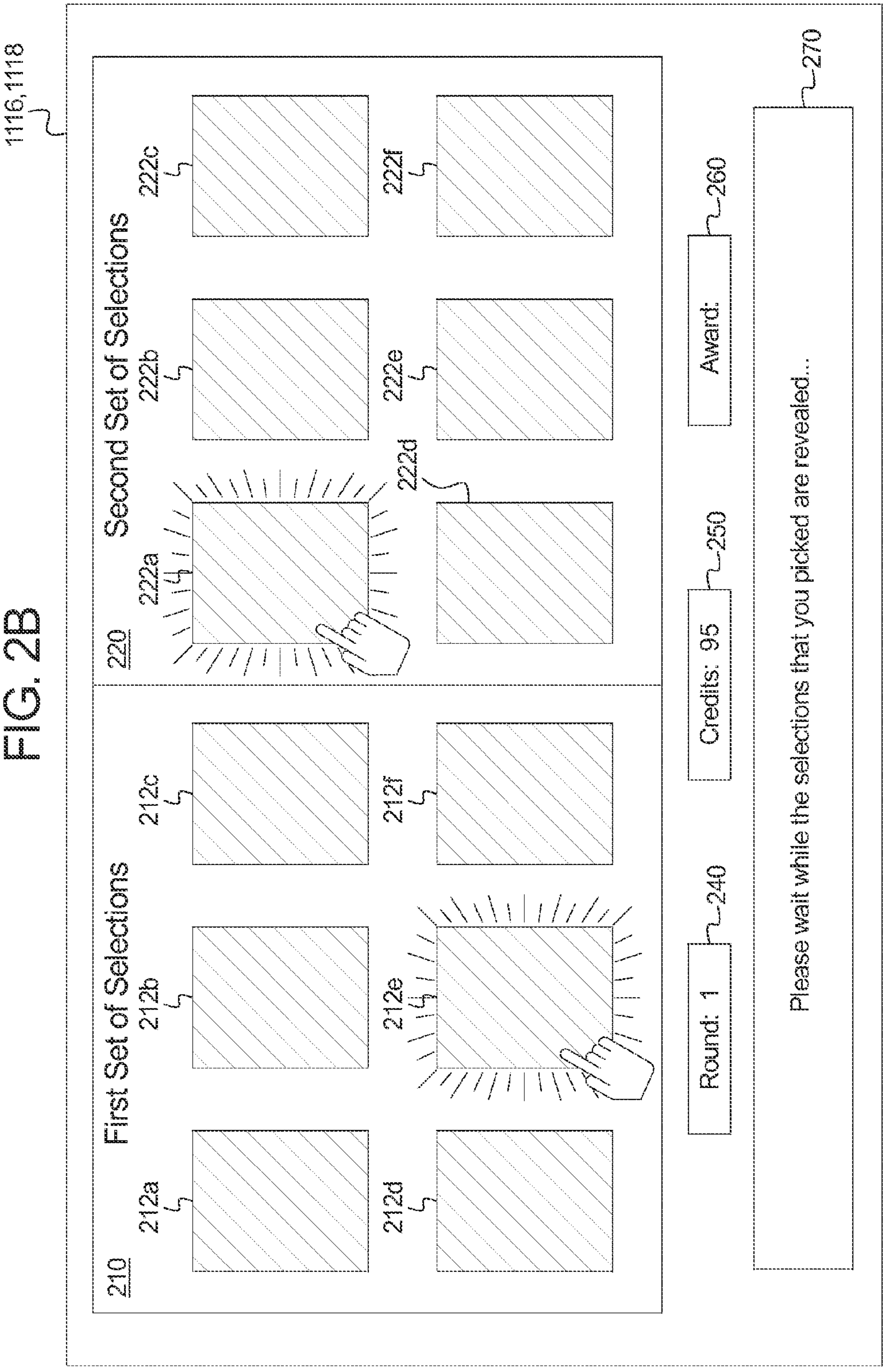

As illustrated in FIG. 2B, the gaming system receives a pick of displayed selection 212*e* from the first set of selections and a pick of displayed selection 222*a* from the second set of selections from the player. The gaming system displays the following message in message display 270: "PLEASE WAIT WHILE THE SELECTIONS THAT YOU PICKED ARE REVEALED . . . . "

Figure 2C:
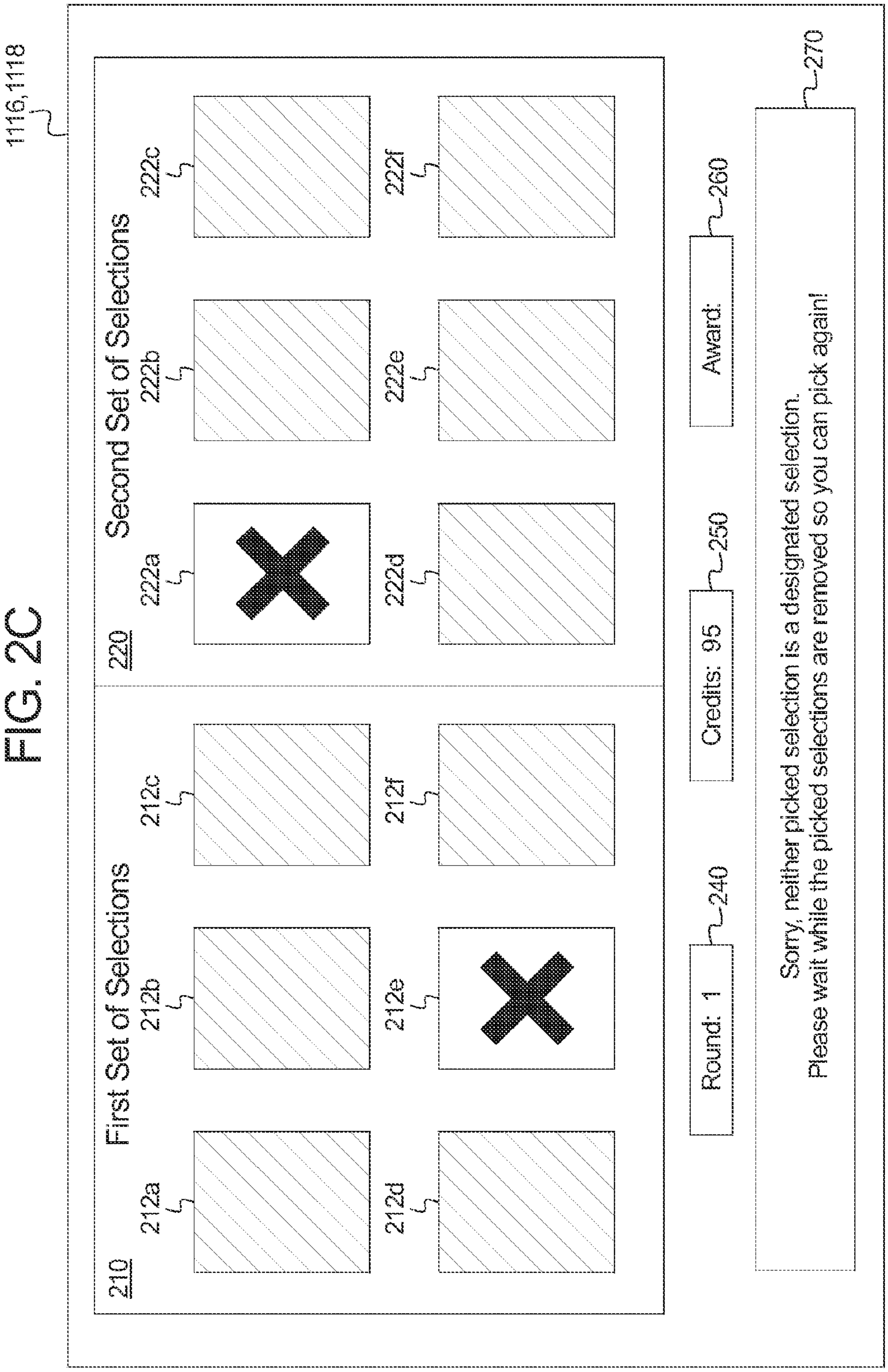

As illustrated in FIG. 2C, the gaming system reveals the player's picked selections. That is, the gaming system indicates whether picked selection 212*e* and picked selection 222*a* are the designated one of the first set of selections and the designated one of the second set of selections, respectively. In this instance, the gaming system displays an "X" in association with picked selection 212*e* and in association with picked selection 222*a*, which indicates that picked selection 212*e* and picked selection 222*a* are not the designated one of the first set of selections and the designated one of the second set of selections, respectively. It should be appreciated that the gaming system may indicate that a picked selection is not the designated selection in any suitable manner. The gaming system determines that the designated one of the first set of selections and the designated one of the second set of selections both remain unpicked, and continues play of the selection game. Put differently, the gaming system determines that the designated one of the first set of selections and the designated one of the second set of selections have not both been picked, and continues play of the selection game. The gaming system displays the following message in message display 270: "SORRY, NEITHER PICKED SELECTION IS A DESIGNATED SELECTION, PLEASE WAIT WHILE THE PICKED SELECTIONS ARE REMOVED SO YOU CAN PICK AGAIN!"

Figure 2D:
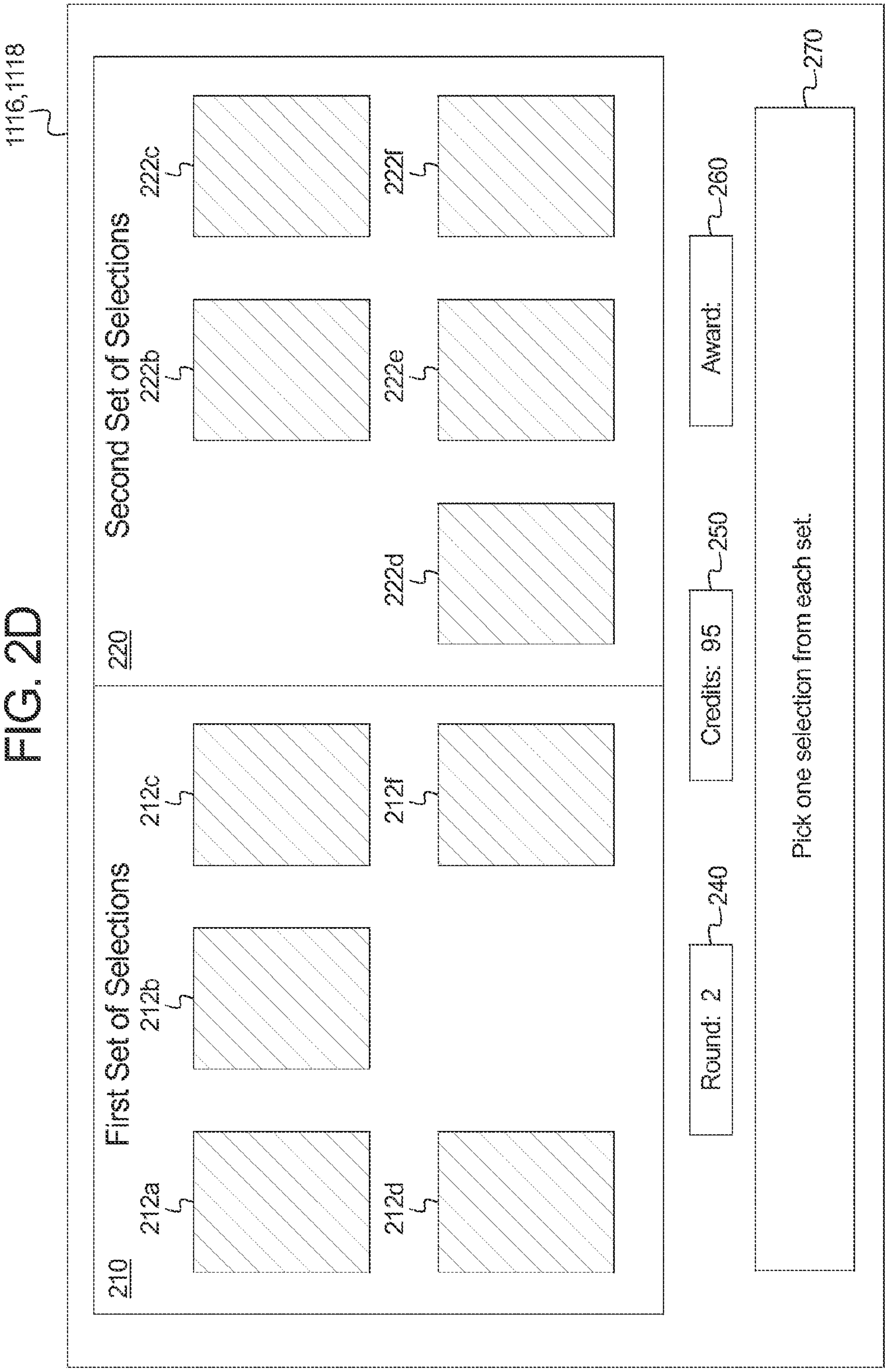

Accordingly, as illustrated in FIG. 2D, the gaming system ends the first selection round and removes picked, non-designated selection 212*e* and picked, non-designated selection 222*a* from first selection set display area 210 and second selection set display area 220, respectively. The gaming system initiates a second selection round, and displays "2" in selection round display 240 to indicate that the current selection round is the second selection round. The gaming system enables the player to pick one of the displayed selections of the first set of selections and one of the displayed selections of the second set of selections. The gaming system displays the following message in message display 270: "PICK ONE SELECTION FROM EACH SET."

Figure 2E:
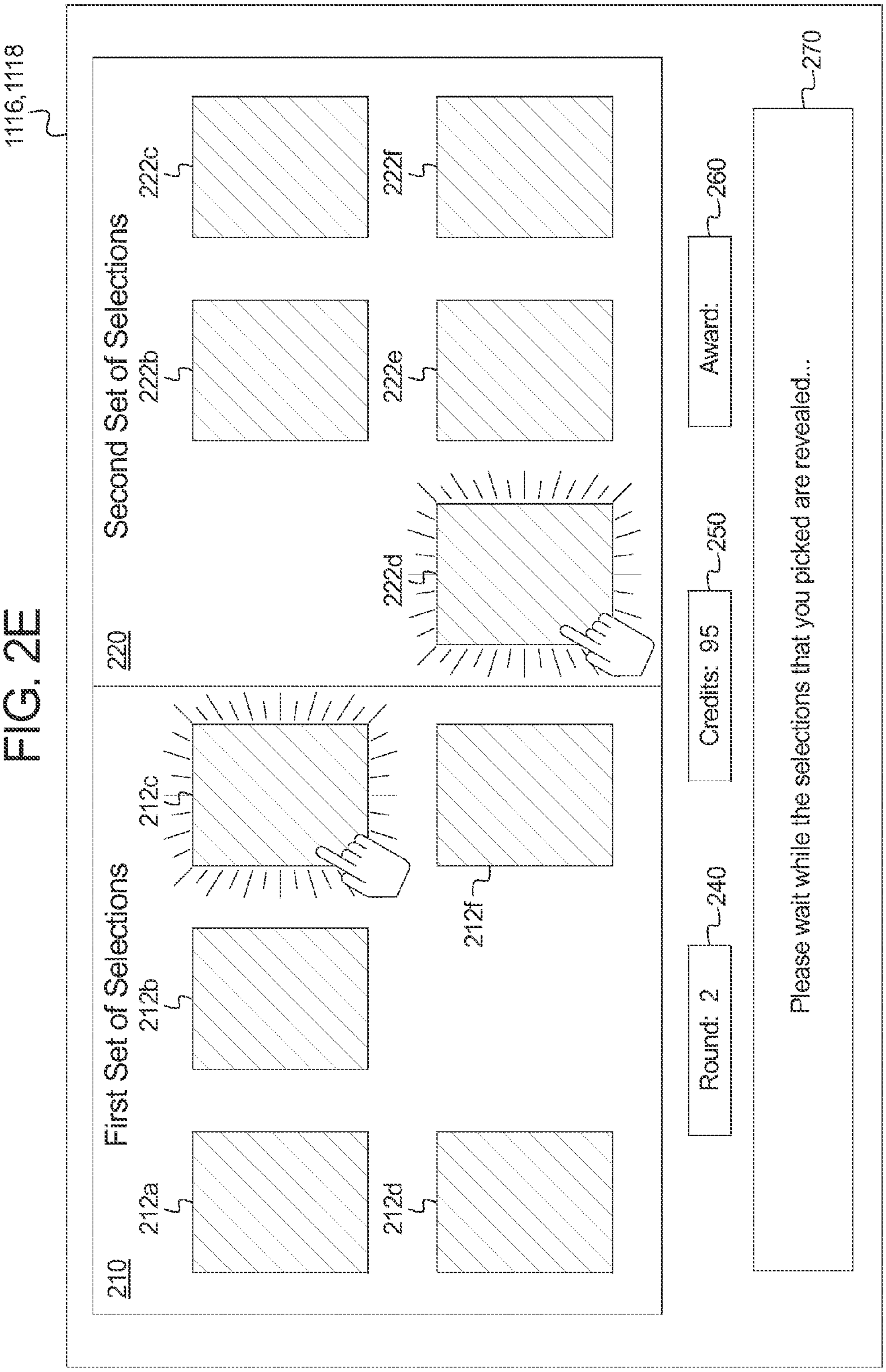

As illustrated icy FIG. 2E, the gaming system receives a pick of displayed selection 212*c* from the first set of selections and selection 222*d* from the second set of selections. The gaming system displays the following message in message display 270: "PLEASE WAIT WHILE THE SELECTIONS THAT YOU PICKED ARE REVEALED . . . . "

Figure 2F:
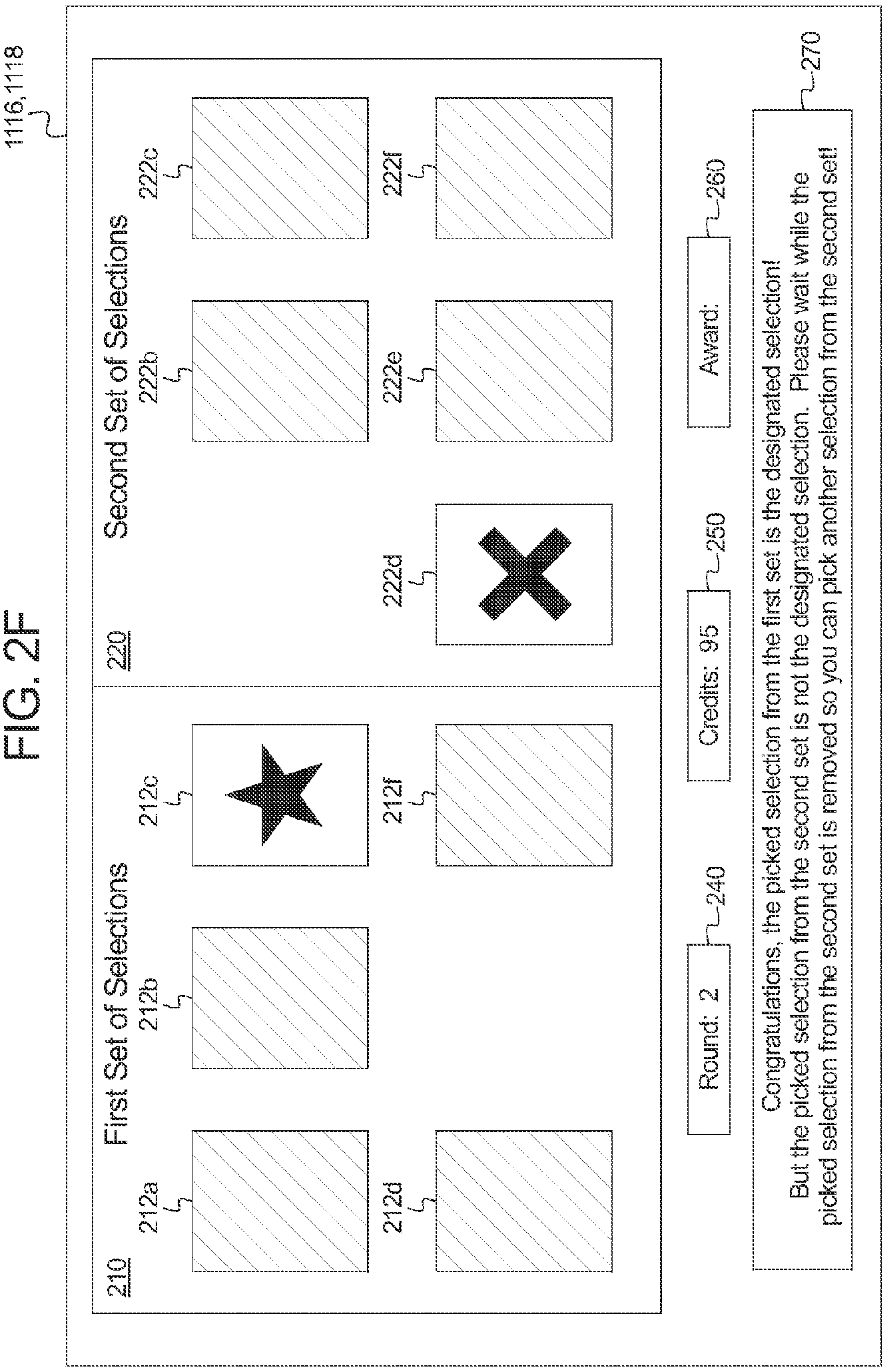

As illustrated in FIG. 2F, the gaming system reveals the player's picked selections. In this instance, the gaming system displays an "X" in association with picked selection 222*d*, which indicates that picked selection 222*d* is not the designated one of the second set of selections. On the other hand, the gaming system displays a "STAR" in association with picked selection 212*c*, which indicates that picked selection 212*c* is the designated one of the first set of selections. It should be appreciated that the gaming system may indicate that a picked selection is the designated selection in any suitable manner. Since the designated one of the second set of selections remains unpicked, the gaming system determines that the designated one of the first set of selections and the designated one of the second set of selections have not both been picked, and continues play of the selection game. The gaming system displays the following message in message display 270: "CONGRATULATIONS, THE PICKED SELECTION FROM THE FIRST SET IS THE DESIGNATED SELECTION! BUT THE PICKED SELECTION FROM THE SECOND SET IS NOT THE DESIGNATED SELECTION. PLEASE WAIT WHILE THE PICKED SELECTION FROM THE SECOND SET IS REMOVED SO YOU CAN PICK ANOTHER SELECTION FROM THE SECOND SET!"

Figure 2G:
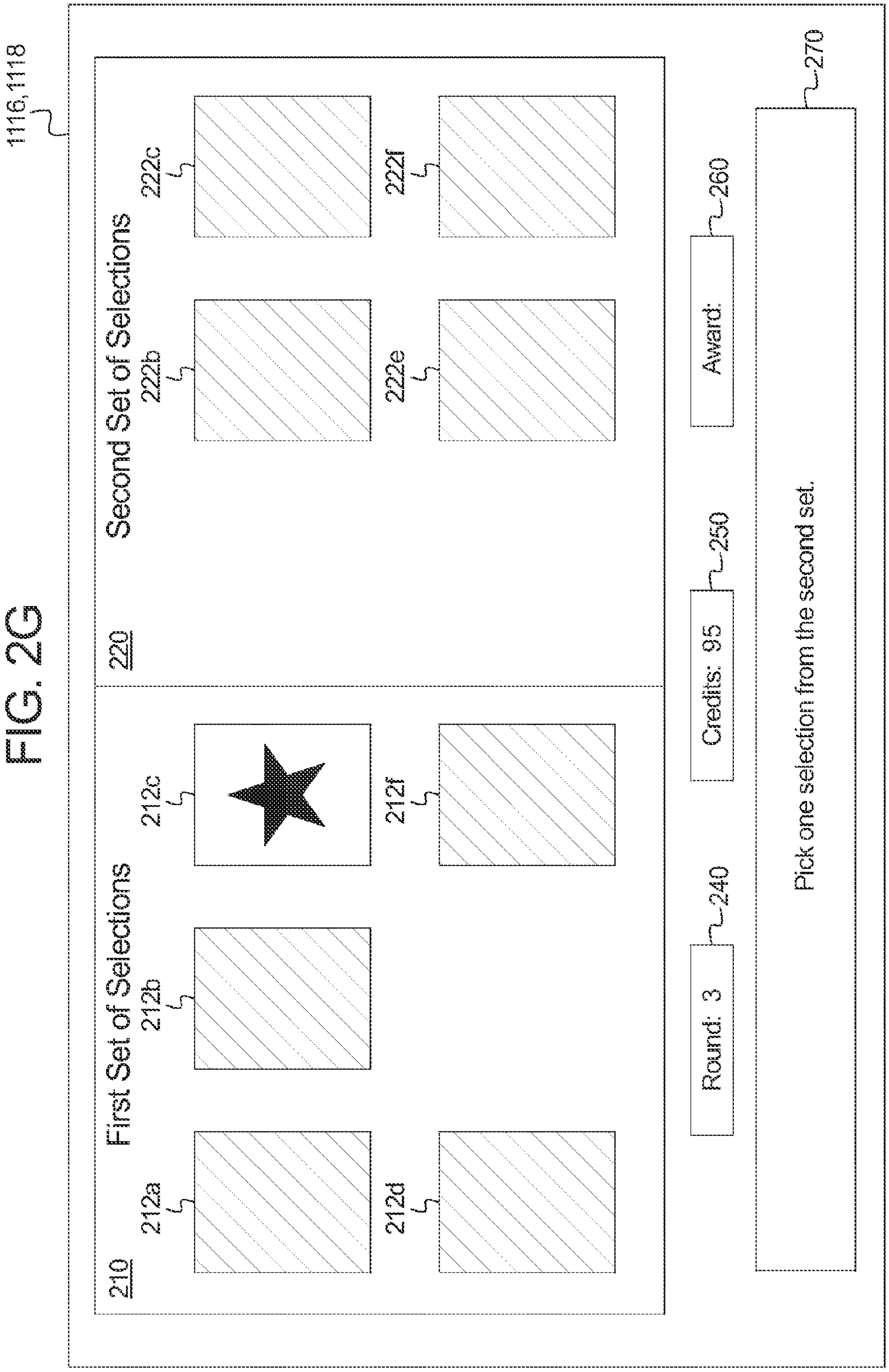

Accordingly, as illustrated in FIG. 2G, the gaming system ends the second selection round and removes picked, non-designated selection 222*c* from second selection set display area 220. The gaming system initiates a third selection round, and displays "3" in selection round display 240 to indicate that the current selection round is the third selection round. The gaming system enables the player to pick one of the displayed selections of the second set of selections. Since the player has already picked the designated one of the first set of selections, the gaming system does not enable the player to pick any of the displayed selections of the first set of selections. The gaming system displays the following message in message display 270: "PICK ONE SELECTION FROM THE SECOND SET."

Figure 2H:
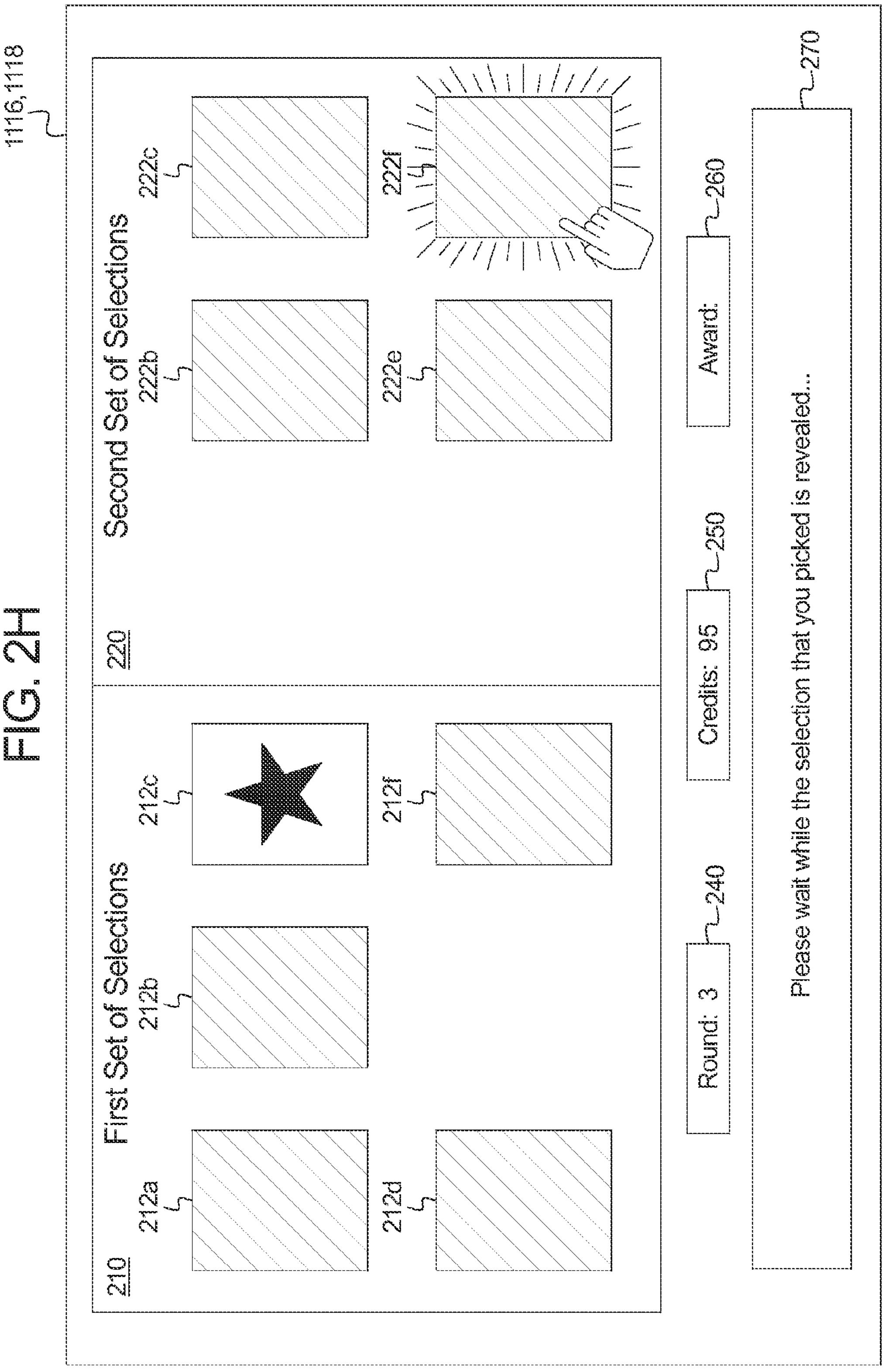

As illustrated in FIG. 2H, the gaming system receives a pick of displayed selection 222*f* from the second set of selections. The gaming system displays the following message in message display 270: "PLEASE WAIT WHILE THE SELECTION THAT YOU PICKED IS REVEALED . . . . "

Figure 2I:
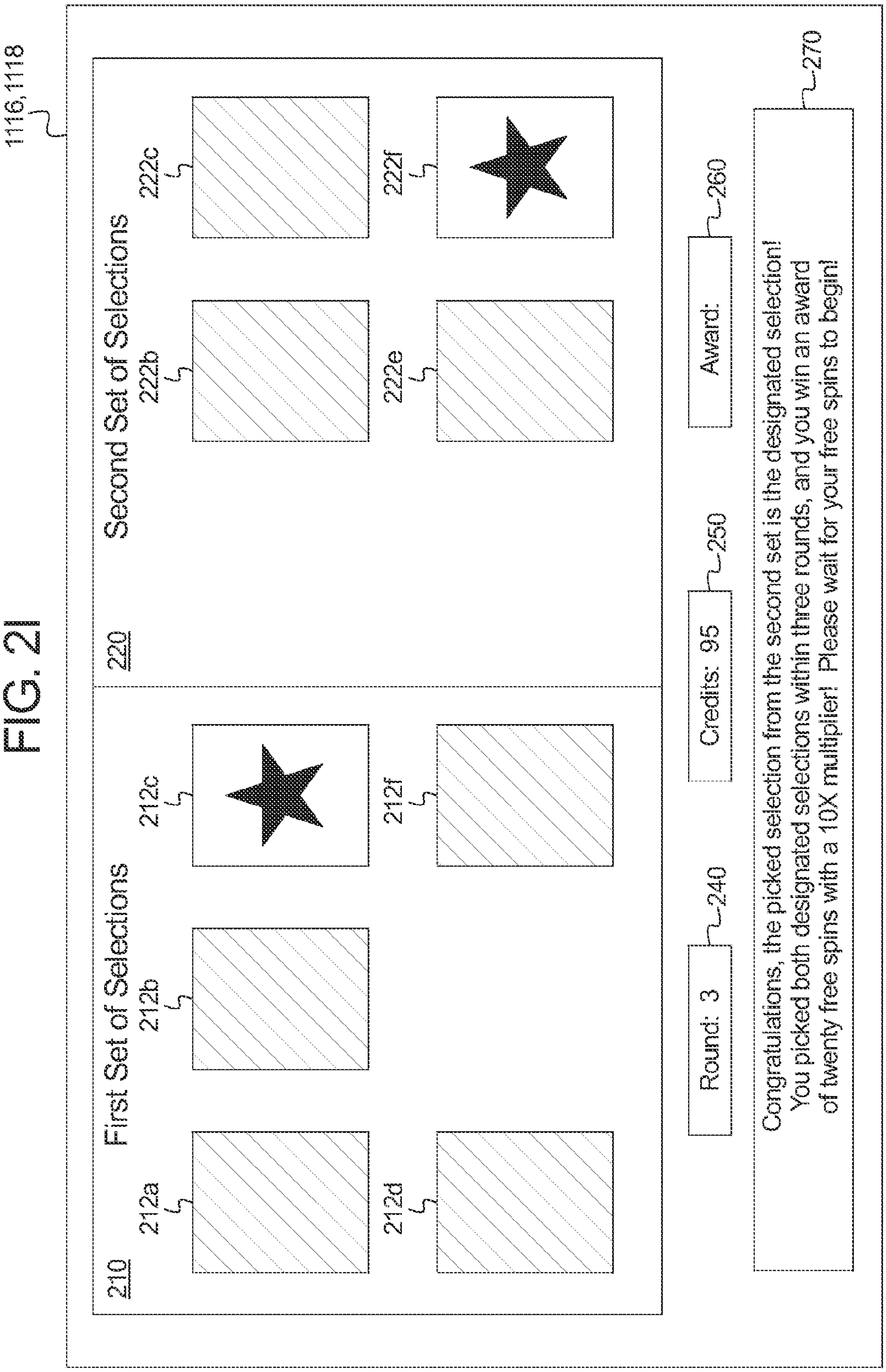

As illustrated in FIG. 2I, the gaming system reveals the player's picked selection. In this instance, the gaming system displays a "STAR" in association with picked selection 222*f*, which indicates that picked selection 222*f* is the designated one of the second set of selections. At this point, the gaming system determines that the designated one of the first set of selections and the designated one of the second set of selections have both been picked. Accordingly, the gaming system determines an award based on the total quantity of initiated selection rounds. In this example, it took the player three selection rounds to pick both the designated one of the first set of selections and the designated one of the second set of selections. In this example, the gaming system determines an award of twenty free spins of a slot type game with a 10× multiplier associated with the total initiated quantity of three selection rounds (as shown in Table 1 above). The gaming system subsequently provides the player the twenty free spins with the 10× multiplier (not shown). The gaming system displays the following message in message display 270: "CONGRATULATIONS, THE PICKED SELECTION FROM THE SECOND SET IS THE DESIGNATED SELECTION! YOU PICKED BOTH DESIGNATED SELECTIONS WITHIN THREE ROUNDS, AND YOU WIN AN AWARD OF TWENTY FREE SPINS WITH A 10× MULTIPLIER! PLEASE WAIT FOR YOUR FREE SPINS TO BEGIN!"

In one embodiment, the gaming system provides the player a designated quantity of picks for each selection round, regardless of whether any of the designated selections have been picked. The gaming system enables the player to use all of the designated quantity of picks during that selection round, regardless of whether any of the designated selections have been picked. In one example, the gaming system displays two sets of selections, and provides the player two picks per selection round. In this example, the player picks the designated one of the first set of selections, but does not pick the designated one of the second set of selections, in the first selection round. For the second selection round, the gaming system enables the player to use each of the two picks to pick one of the displayed selections of the second set of selections (i.e., enables the player to pick two of the displayed selections of the second set of selections).

In another embodiment, the gaming system provides the player with an initial quantity of picks, and enables the player to use those picks to pick any displayed selections. That is, in this embodiment, the picks are not categorized such that the gaming system requires the player to use certain picks to pick from certain sets of selections. In one variation, the gaming system provides the player with an additional quantity of picks (such as one or two picks) if the player picks one of the designated selections.

In another embodiment, the gaming system provides an additional award (such as any of those described above) or an award enhancement if the player picks the designated one of the first set of selections and/or the designated one of the second set of selections within a designated quantity of selection rounds. For instance, if the player picks one or both of the designated one of the first set of selections and the designated one of the second set of selections within the first selection round, the gaming system provides an additional award of a designated quantity of credits or a multiplier used to enhance the player's total award for the play of the selection game.

In a further embodiment, the gaming system provides an additional award (such as any of those described above) or an award enhancement if the player picks the designated one of the first set of selections and the designated one of the second set of selections in the same selection round. For instance, if the player picks both the designated one of the first set of selections and the designated one of the second set of selections in the second selection round, the gaming system provides an additional award of a designated quantity of credits or a multiplier used to enhance the player's total award for the play of the selection game.

In various embodiments, the gaming system provides the selection game for a designated quantity of selection rounds. In these embodiments, if the player does not pick both the designated one of the first set of selections and the designated one of the second set of selections within the designated quantity of selection rounds, the gaming system ends the play of the selection game. In one such embodiment, the gaming system enables the player to choose the designated quantity of selection rounds, and provides relatively more valuable sets of awards for relatively lower designated quantities of selection rounds. In certain such embodiments, the gaming system provides the player a consolation award if the gaming system ends the play of the selection game before the player picks both the designated one of the first set of selections and the designated one of the second set of selections.

In certain such embodiments, if the gaming system ends the play of the selection game before the player picks both the designated one of the first set of selections and the designated one of the second set of selections, the gaming system stores the state of the selection game in association with the player. The next time the gaming system initiates a play of the selection game for the player, the gaming system initiates the selection game where the player left off when the previous play of the selection game ended. That is, in these embodiments, the state of the selection game and, more specifically, which selections of the sets of selections have been picked, persists from play of the selection game to play of the selection game.

In one such persistence embodiment, the gaming system determines the set of awards associated with the selection game based on an average of the wagers placed by the player for the plays of the primary wagering game that triggered the plays of the selection game. The higher the average of the wagers, the more valuable the awards in the set of awards. Thus, in this embodiment, the gaming system enables the player to cause the awards in the set of awards associated with a selection game stored in a particular state to become more valuable (when the selection game is subsequently triggered) by wagering relatively higher amounts for subsequent plays of the primary wagering game.

In another such persistence embodiment, the gaming system maintains a persistent data state for each wager level. Thus, there is an independent state of the selection game stored by the gaming system for each qualifying wager level. For instance, the gaming system maintains, for each player, for each wager level, where that player left off in the previous play of the selection game at that wager level. In another such persistence embodiment, the gaming system maintains a persistent data state for only the highest wager level (such as the maximum wager). In this embodiment, when the selection game is triggered at a wager level other than the highest wager level, the selection game starts anew, regardless of where the player left off in the previous play of the selection game at that wager level.

In certain embodiments, the selection game is a multi-player game played by a plurality of players. In one such embodiment, each player is associated with a different set of a plurality of selections. For a first selection round, the gaming system enables each player to pick one of the displayed selections of the set of selections associated with that player. If at least one of the players does not pick a designated one of the set of selections associated with that player, the gaming system ends the first selection round; removes any picked, non-designated selections; and initiates another selection round. Each player who did not pick the designated one of the set of selections associated with that player participates in the subsequent selection round. Once each player has picked the designated one of the set of selections associated with that player, the gaming system determines an award from the set of awards associated with the selection game based on the total quantity of initiated selection rounds. That is, the gaming system determines an award based on how many selection rounds it took the players to each pick the designated one of the set of selections associated with that player. The gaming system provides the determined award (or, in certain embodiments, a portion of the determined award) to each of the players.

In one such multi-player embodiment, the gaming system provides an additional award (such as any of those described above) or an award enhancement to players who pick the designated one of the set of selections associated with that player within a designated quantity of selection rounds. For example, the gaming system provides each player (if any) who picks the designated one of the set of selections associated with that player in the first selection round with a 2× multiplier used to modify any award provided to that player for the play of the selection game.

In certain embodiments, the gaming system provides the player an additional bonus game (such as the selection game or any other suitable game) if the player picks the designated one of the first set of selections and the designated one of the second set of selections within a designated quantity of selection rounds. For example, if the player selects the designated one of the first set of selections and the designated one of the second set of selections within two selection rounds, the gaming system provides the player the award associated with the total quantity of two initiated selection rounds and provides the player a free spin of an award wheel.

In one such embodiment in which the gaming system provides the selection game for a designated quantity of selection rounds and the player picks both the designated one of the first set of selections and the designated one of the second set of selections in fewer than the designated quantity of selection rounds, the gaming system provides another play of the selection game in which the player may use any unused selection rounds of the designated quantity. For example, for a play of the selection game, the gaming system provides the player six selection rounds, and the player picks the designated one of the first set of selections and the designated one of the second set of selections within three selection rounds. The gaming system provides another play of the selection game and provides the player the three unused selection rounds (if necessary) from the previous play of the selection game.

In certain embodiments, each set of selections is associated with a different award component, and the gaming system determines the respective components of the award for the play of the selection game based on the quantity of selection rounds it takes for the player to pick the designated ones of the set of selections associated with the respective components. For example, the first set of selections is associated with a quantity of free spins, and the second set of selections is associated with a multiplier. In this example, the gaming system determines the quantity of free spins to provide to the player (i.e., the free spins component of the award) based on the quantity of selection rounds it takes for the player to pick the designated one of the first set of selections and determines the multiplier to use for those free spins (i.e., the multiplier component of the award) based on the quantity of selection rounds it takes for the player to pick the designated one of the second set of selections.

In one embodiment, the gaming system enables the player to choose the set of awards associated with the selection game. In one example, the sets of awards include different types of awards. For instance, one set of awards includes varying quantities of free spins subject to varying multipliers, while another set of awards includes varying quantities of free spins including reels having stacked wild symbols. In another example, the sets of awards include different volatilities of the same type of awards. For instance, one set of awards includes 50 free spins, 25 free spins, 10 free spins, and 5 free spins, while another set of awards includes 30 free spins, 25 free spins, 20 free spins, and 15 free spins.

Figure 3A:
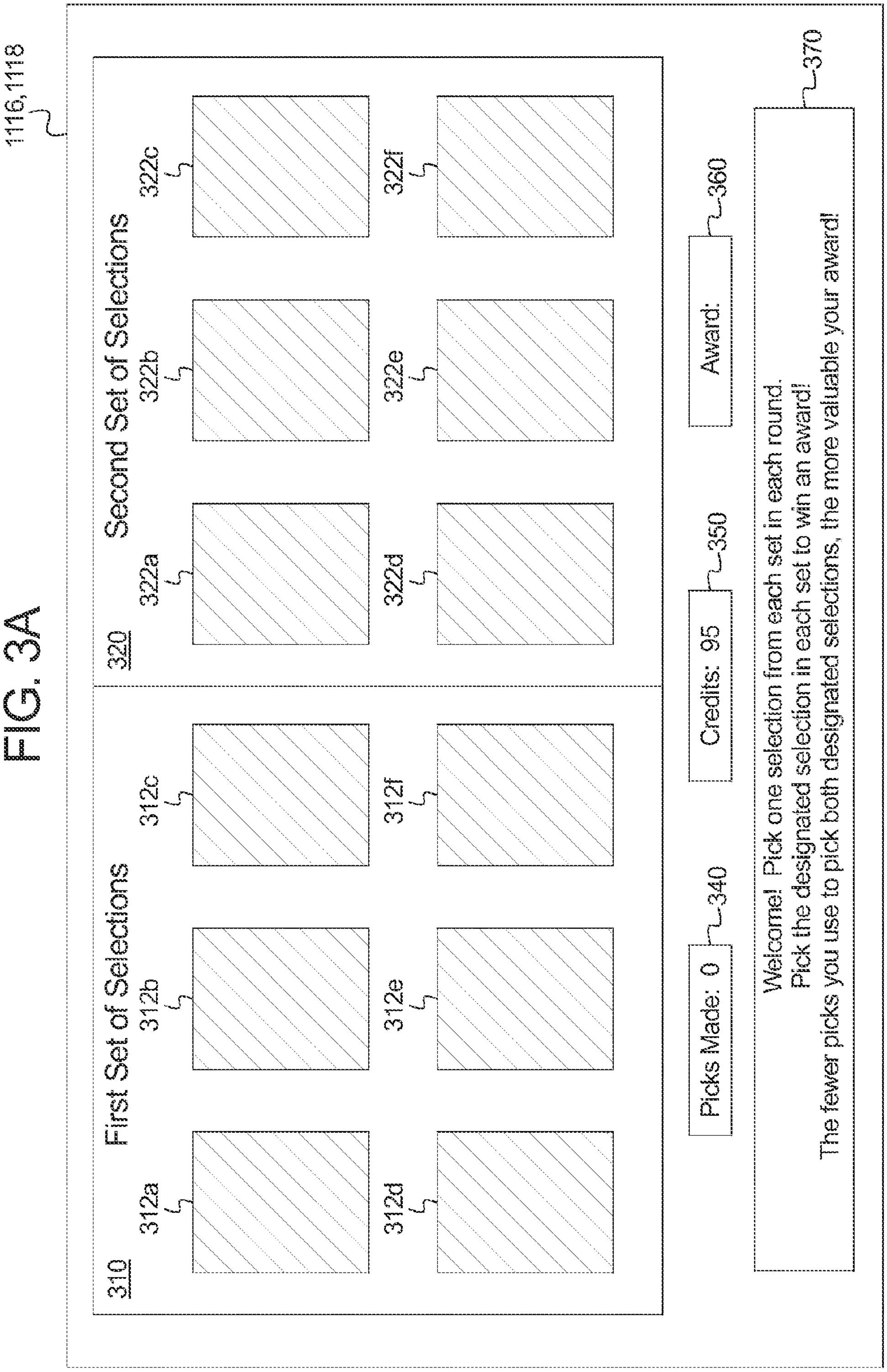
FIGS. 3A, 3B, and 3C illustrate screen shots of another embodiment of the gaining system of the present disclosure operating another example of the selection game of the present disclosure in which the gaming system determines an award to provide to the player based on a total quantity of picks made by the player.
Figure 3B:
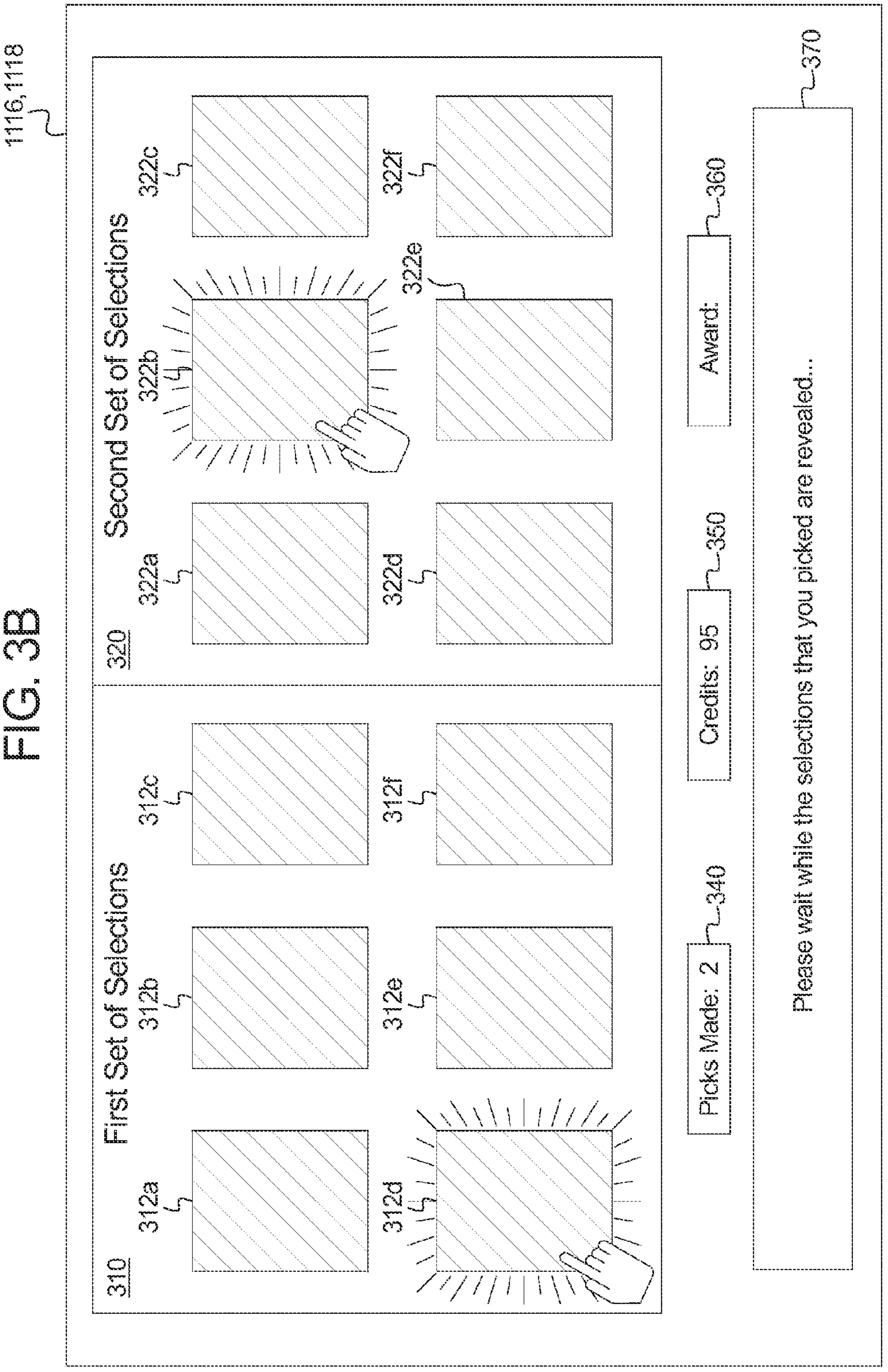
Figure 3C:
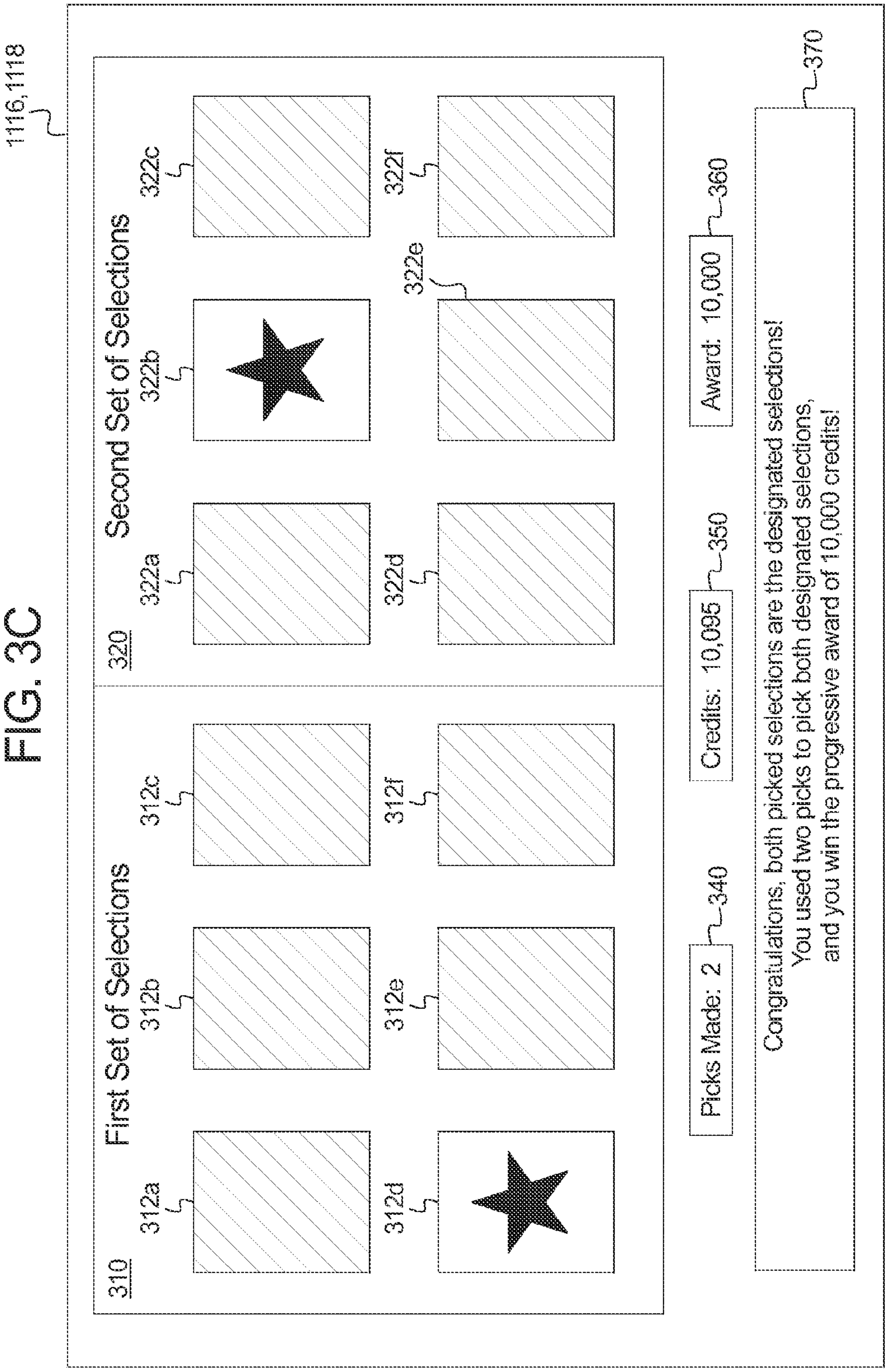

In other embodiments, rather than determining an award based on a total quantity of initiated selection rounds, the gaming system determines an award based on a total quantity of picks made by the player. FIGS. 3A, 3B, and 3C illustrate screen shots of another embodiment of the gaming system of the present disclosure providing a play of such an example of the selection game. In this embodiment, play of the selection game proceeds as generally described above; however, the gaming system determines one of a set of awards associated with the selection game based on a total quantity of picks made by the player. In this embodiment, the lower the quantity of picks made by the player, the more valuable the award. Accordingly, it should be appreciated that, in this embodiment, the gaming system incentivizes the player to pick the designated selections in using as few picks as possible to maximize the player's award. The set of awards associated with the selection game in this embodiment and the quantities of picks associated with the respective awards are listed in Table 2 below.

TABLE 2

Set of Awards Associated with Example Selection Game

| Total Quantity of Picks Made by the Player | Award |
|---|---|
| Two | Progressive Award #1 |
| Three or Four | Progressive Award #2 |
| Five or Six | 20 Free Spins with Stacked Wilds |
| Seven or Eight | 15 Free Spins with Stacked Wilds |
| Nine or Ten | 10 Free Spins with Stacked Wilds |
| Eleven or Twelve | 5 Free Spins with Stacked Wilds |

Turning to FIG. 3A, upon initiation of a play of the selection game in this illustrated example, the gaming system displays, such as on a display device 1116 or 1118 (described below), a first selection set display area 310 and a second selection set display area 320. The gaming system displays a first set of a plurality of selections 312*a*, 312*b*, 312*c*, 312*d*, 312*e*, and 312*f* in first selection set display area 310 and a second set of a plurality of selections 322*a*, 322*b*, 322*c*, 322*d*, 322*e*, and 322*f* in second selection set display area 320. The gaming system also displays a selection round display 340, which displays the current selection round; a credit display 350, which displays the player's credit balance; an award display 360, which displays any awards provided to the player for the play of the selection game; and a message display 370, which displays messages or indications before, during, or after play of the selection game.

Upon initiation of the play of the selection game, the gaming system initiates a first selection round, and displays "1" in selection round display 340 to indicate that the current selection round is the first selection round. The gaming system enables the player to pick one of the displayed selections of the first set of selections and one of the displayed selections of the second set of selections. The gaming system displays the following message in message display 370: "WELCOME! PICK ONE SELECTION FROM EACH SET. PICK THE DESIGNATED SELECTION IN EACH SET TO WIN AN AWARD! THE FEWER PICKS YOU USE TO PICK BOTH DESIGNATED SELECTIONS, THE MORE VALUABLE YOUR AWARD!"

As illustrated in FIG. 3B, the gaming system receives a pick of displayed selection 312*d* from the first set of selections and a pick of displayed selection 322*b* from the second set of selections from the player. The gaming system displays the following message in message display 370: "PLEASE WAIT WHILE THE SELECTIONS THAT YOU PICKED ARE REVEALED . . . . "

As illustrated in FIG. 3C, the gaming system reveals the player's picked selections. In this instance, the gaming system displays a "STAR" in association with picked selection 312*d* and in association with picked selection 322*b*, which indicates that picked selection 312*d* and picked selection 322*b* are the designated one of the first set of selections and the designated one of the second set of selections, respectively. At this point, the gaming system determines that the designated one of the first set of selections and the designated one of the second set of selections have both been picked. Accordingly, the gaming system determines an award based on the quantity of picks made by the player. In this example, the player made a total of two picks. In this example, the gaming system determines an award of 10,000 credits associated with the total quantity of two picks made by the player (i.e., the Progressive #1 Award shown in Table 2 above). The gaming system displays the award of 10,000 credits in award display 360, and updates the player's credit balance displayed in credit display 350 to 10,095 credits to reflect the 10,000 credit award. The gaming system displays the following message in message display 370: "CONGRATULATIONS, BOTH PICKED SELECTIONS ARE THE DESIGNATED SELECTIONS! YOU USED TWO PICKS TO PICK BOTH DESIGNATED SELECTIONS, AND YOU WIN THE PROGRESSIVE AWARD OF 10,000 CREDITS!"

In various embodiments, the gaming system provides the player a designated quantity of picks for use in the play of the selection game. The gaming system enables the player to use up to the designated quantity of picks during the play of the selection game, regardless of whether any of the designated selections have been picked. In one example, the gaming system displays two sets of selections, and provides the player ten picks. In this example, the player has ten picks to use to try to pick the designated one of the first set of selections and the designated one of the second set of selections. In these embodiments, if the player does not pick both the designated one of the first set of selections and the designated one of the second set of selections before the player uses the designated quantity of picks, the gaming system ends the play of the selection game.

In one such embodiment, the gaming system enables the player to choose the designated quantity of picks, and provides relatively more valuable sets of awards for relatively lower designated quantities of picks. In certain such embodiments, the gaming system provides the player a consolation award if the gaming system ends the play of the selection game before the player picks both the designated one of the first set of selections and the designated one of the second set of selections.

In certain such embodiments, if the gaming system ends the play of the selection game before the player picks both the designated one of the first set of selections and the designated one of the second set of selections, the gaming system stores the state of the selection game in association with the player. The next time the gaming system initiates a play of the selection game for the player, the gaming system initiates the selection game where the player left off when the previous play of the selection game ended. That is, in these embodiments, the state of the selection game and, more specifically, which selections of the sets of selections have been picked, persists from play of the selection game to play of the selection game.

In one such persistence embodiment, the gaming system determines the set of awards associated with the selection game based on an average of the wagers placed by the player for the plays of the primary wagering game that triggered the plays of the selection game. The higher the average of the wagers, the more valuable the awards in the set of awards. Thus, in this embodiment, the gaming system enables the player to cause the awards in the set of awards associated with a selection game stored in a particular state to become more valuable (when the selection game is subsequently triggered) by wagering relatively higher amounts for subsequent plays of the primary wagering game.

In another embodiment, the gaming system provides an additional award (such as any of those described above) or an award enhancement based on how quickly the player picks the designated one of the first set of selections and/or the designated one of the second set of selections. For instance, if the player picks one or both of the designated one of the first set of selections and the designated one of the second set of selections within four picks, the gaming system provides an additional award of a designated quantity of credits or a multiplier used to enhance the player's total award for the play of the selection game.

In a further embodiment, the gaming system provides an additional award (such as any of those described above) or an award enhancement if the player picks the designated one of the first set of selections and the designated one of the second set of selections using sequential picks. For instance, if the player picks the designated one of the first set of selections using the player's third pick and the designated one of the second set of selections using the player's fourth pick, the gaining system provides an additional award of a designated quantity of credits or a multiplier used to enhance the player's total award for the play of the selection game.

In certain embodiments, the selection game is a multi-player game played by a plurality of players. In one such embodiment, each player is associated with a different set of a plurality of selections. The gaming system enables each player to pick displayed selections of the set of selections associated with that player until the player picks the designated one of the set of selections associated with that player. Once each player has picked the designated one of the set of selections associated with that player, the gaming system determines an award from the set of awards associated with the selection game based on the total quantity of picks made by the players. The gaming system provides the determined award (or, in certain embodiments, a portion of the determined award) to each of the players. In one example, the gaming system provides higher portions of the determined award to players who made relatively fewer picks.

In one such multi-player embodiment, the gaming system provides an additional award (such as any of those described above) or an award enhancement to players who pick the designated one of the set of selections associated with that player within a designated quantity of picks. For example, the gaming system provides each player (if any) who picks the designated one of the set of selections associated with that player within two of fewer picks with a 2× multiplier used to modify any award provided to that player for the play of the selection game.

In certain embodiments, the gaming system provides the player an additional bonus game (such as the selection game or any other suitable game) if the player picks the designated one of the first set of selections and the designated one of the second set of selections within a designated quantity of picks. For example, if the player selects the designated one of the first set of selections and the designated one of the second set of selections within two picks, the gaming system provides the player the award associated with the total quantity of two picks and provides the player a free spin of an award wheel.

In one such embodiment in which the gaming system provides the selection game for up to a designated quantity of picks and the player picks both the designated one of the first set of selections and the designated one of the second set of selections using fewer than the designated quantity of picks, the gaming system provides another play of the selection game in which the player may use any unused picks of the designated quantity. For example, for a play of the selection game, the gaming system provides the player ten picks, and the player picks the designated one of the first set of selections and the designated one of the second set of selections using six picks. The gaming system provides another play of the selection game and enables the player to use the four unused picks from the previous play of the selection game.

In certain embodiments, each set of selections is associated with a different award component, and the gaming system determines the respective components of the award for the play of the selection game based on the total quantity of picks it takes for the player to pick the designated ones of the set of selections associated with the respective components. For example, the first set of selections is associated with a quantity of free spins, and the second set of selections is associated with a multiplier. In this example, the gaming system determines the quantity of free spins to provide to the player (i.e., the free spins component of the award) based on the total quantity of picks it takes for the player to pick the designated one of the first set of selections and determines the multiplier to use for those free spins (i.e., the multiplier component of the award) based on the total quantity of picks it takes for the player to pick the designated one of the second set of selections.

In certain embodiments, the selection game includes a "horseshoe-type" paytable, such as the paytable included in Table 3 below. In such embodiments, the gaming system provides relatively high awards for using a relatively small quantity of picks to pick the designated selections and for using a relatively large quantity of picks to pick the designated selections.

TABLE 3

"Horseshoe" Paytable Associated with Example Selection Game

| Total Quantity of Initiated Selection Rounds | Award |
|---|---|
| One | Progressive Award #1 |
| Two | 20 Free Spins with a 10X Multiplier |
| Three | 20 Free Spins with a 5X Multiplier |
| Four | 20 Free Spins with a 5X Multiplier |
| Five | 20 Free Spins with a 10X Multiplier |
| Six | Progressive Award #1 |

Although the above-described embodiments are described with respect to two sets of selections, the present disclosure contemplates providing the selection game with any suitable quantity of sets of selections. In one example, the selection game associated with four sets of selections. In one multiplayer example, the quantity of sets of selections varies according to the quantity of players playing the multiplayer selection game. It should be appreciated that the gaming system determines how many sets of selections to employ for a play of the selection game in any suitable manner(s) and/or based on any suitable factor(s) or event(s).

Similarly, although the above-described embodiments are described with respect to sets of selections of the same size, the present disclosure contemplates providing the selection game with sets of selections having different sizes.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines (EGMs); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 4A:
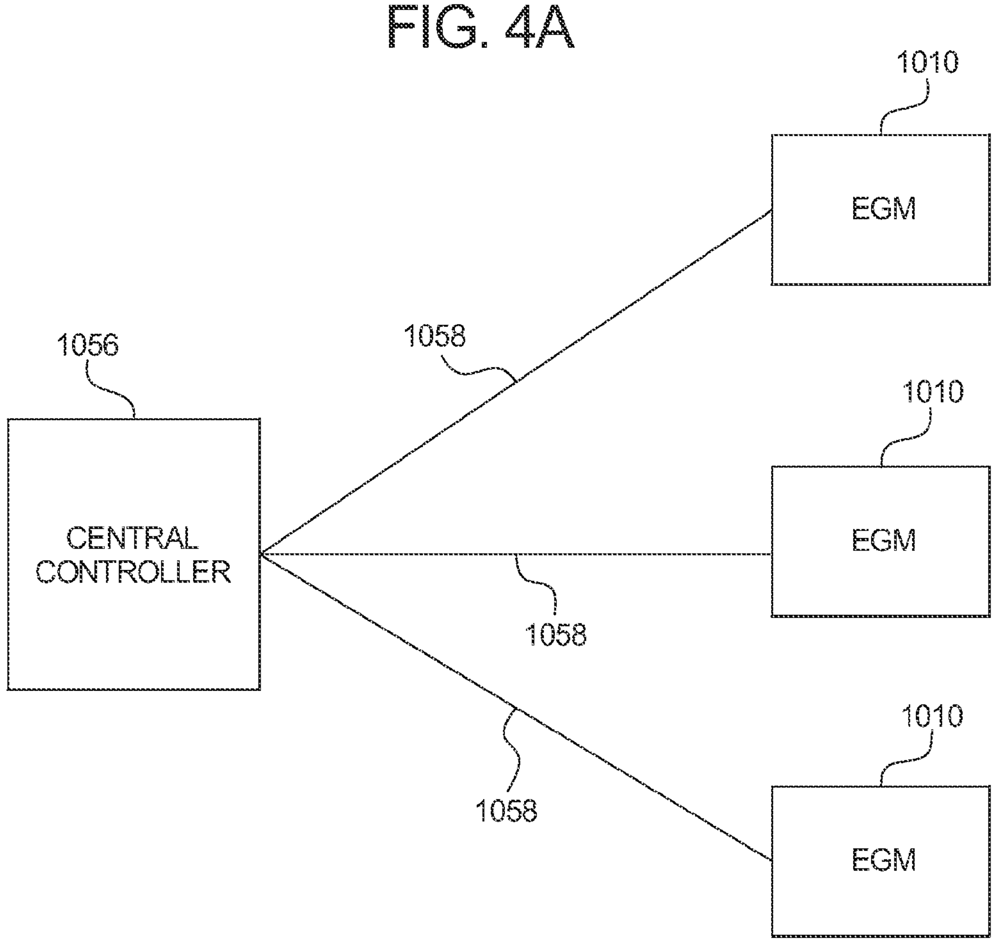
FIG. 4A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 4A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such “thin client” embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such “thick client” embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below): by validating a unique player identification number associated with the player by the central server, central controller, or remote host; or by identifying the EGM, such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 4B:
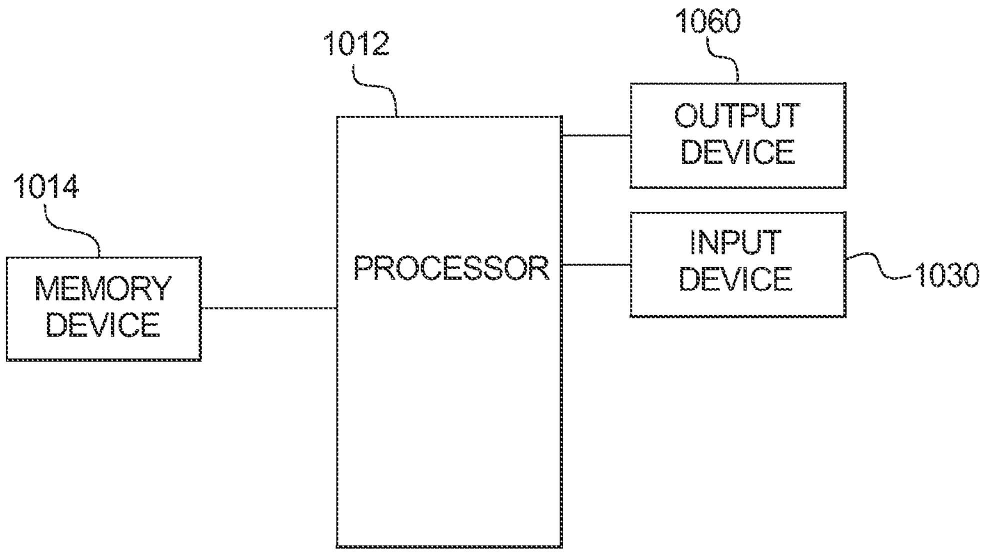
FIG. 4B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 4B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 4B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 5A:
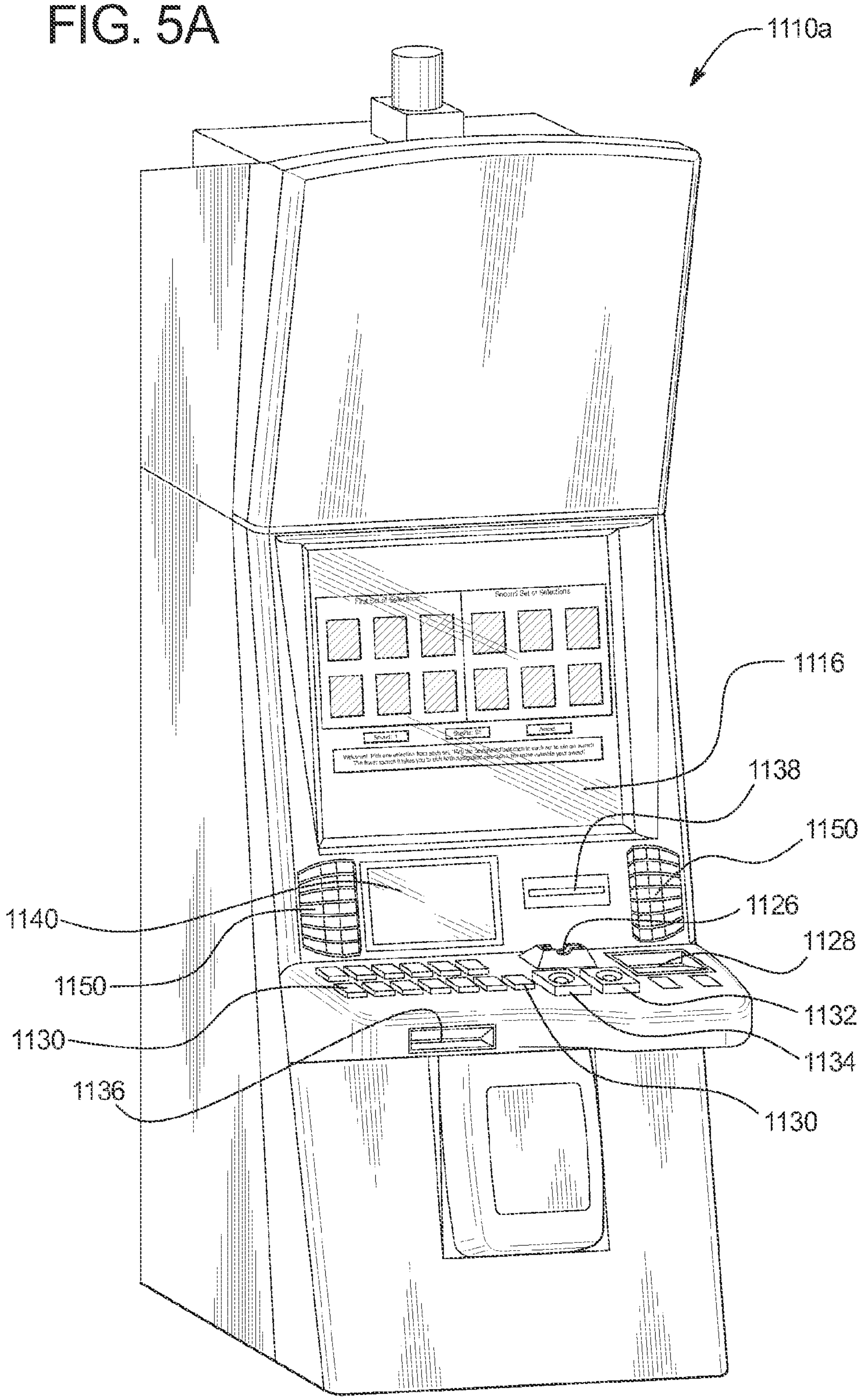
FIGS. 5A and 5B are perspective views of example alternative embodiments of the gaming system of the present disclosure.
Figure 5B:
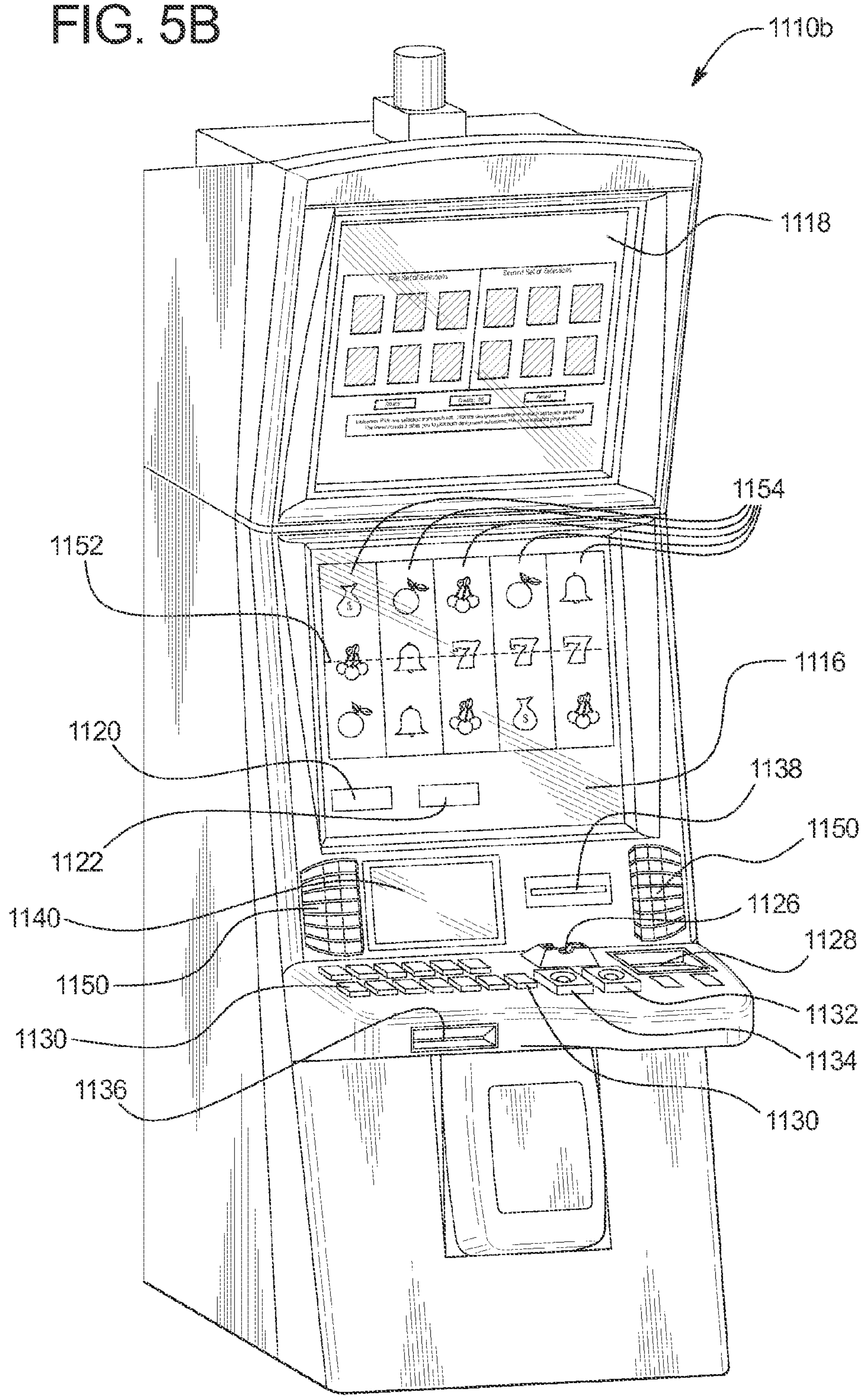

In various embodiments, the EGM includes one or more input devices. The input devices may include any suitable device that enables an input signal to be produced and received by the at least one processor of the EGM. The example EGM illustrated in FIG. 4B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof, FIGS. 5A and 5B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 5A and 5B each include a game play activation device in the form of a game play initiation button 1132. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 5A and 5B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 5A and 5B each include a card reader 1138. The card reader is configured to read a player identification card inserted into the card reader.

In various embodiments, the EGM includes one or more output devices. The example EGM illustrated in FIG. 4B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 5A and 5B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 5A and 5B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 5A and 5B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 5A and 5B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaining system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIG. 5B includes a payline 1152 and a plurality of reels 1154. In certain embodiments, one or more of the reels are independent reels or unisymnbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

at least one processor;

at least one display device supported by the housing;

a plurality of input devices supported by the housing, the plurality of input devices including an acceptor; and at least one memory device storing a plurality of instructions which, when executed by the at least one processor, cause the at least one processor to operate with the at least one display device and the plurality of input devices to:

(a) if a physical item associated with a monetary value is received by the acceptor, establish a credit balance based at least in part on the monetary value associated with the received physical item;

(b) for a play of a selection game, display a first set of a plurality of selections and a second set of a plurality of selections;

(c) initiate a selection round;

(d) for said selection round:

(i) if a designated one of the first set of selections remains unpicked, enable the player to pick one of the displayed selections of the first set of selections;

(ii) if a designated one of the second set of selections remains unpicked, enable the player to pick one of the displayed selections of the second set of selections; and (iii) after receiving any player picks:

(A) if the designated one of the first set of selections and the designated one of the second set of selections have both been picked, determine one of a set of a plurality of awards associated with the selection game based on a total quantity of initiated selection rounds, display the determined award, and increase the credit balance based on the determined award; and (B) if at least one of the designated one of the first set of selections and the designated one of the second set of selections remains unpicked, end said selection round and repeat (d) for another selection round; and (e) if a cashout input is received by a cashout button, initiate a payout associated with the credit balance.

2. The gaming system of claim 1, wherein the plurality of instructions, when executed by the at least one processor, cause the at last one processor to, upon an occurrence of a bonus triggering event:

(1) select one of a plurality of bonus games including the selection game, wherein each of the bonus games is associated with a set of a plurality of awards, the sets of awards associated with at least two of the bonus games are different, and the sets of awards each include at least one same award; and (2) provide (b) to (d) for said play of the selection game when the selected bonus game is the selection game.

3. The gaming system of claim 1, wherein the plurality of instructions, when executed by the at least one processor, cause the at least one processor to operate with the at least one display device to:

(a) display the first set of selections in a first selection set display area;

(b) display the second set of selections in a second selection set display area; and (c) remove any picked non-designated selections of the first set of selections from the first selection set display area and any picked non-designated selections of the second set of selections from the second selection set display area.

4. The gaming system of claim 1, wherein the plurality of instructions, when executed by the at least one processor, cause the at least one processor to, for each initiated selection round, provide the player a designated quantity of picks, each of which is usable in said selection round.

5. The gaming system of claim 1, wherein the plurality of instructions, when executed by the at least one processor, cause the at least one processor to provide an additional award if the designated one of the first set of selections and the designated one of the second set of selections are both picked within a designated quantity of selection rounds.

6. The gaming system of claim 1, wherein the plurality of instructions, when executed by the at least one processor, cause the at least one processor to provide an additional award if the designated one of the first set of selections and the designated one of the second set of selections are both picked within a same selection round.

7. The gaming system of claim 1, wherein the plurality of instructions, when executed by the at least one processor, cause the at least one processor to provide an additional award opportunity if the designated one of the first set of selections and the designated one of the second set of selections are both picked within a designated quantity of selection rounds.

8. The gaming system of claim 7, wherein the additional award opportunity is another play of the selection game.

9. The gaming system of claim 1, wherein the plurality of instructions, when executed by the at least one processor, cause the at least one processor to provide the selection game for a designated quantity of selection rounds.

10. The gaming system of claim 9, wherein the plurality of instructions, when executed by the at least one processor, cause the at least one processor to:

(a) if the designated one of the first set of selections and the designated one of the second set of selections are not picked within the designated quantity of selection rounds, end said play of the selection game; and (b) for a subsequent play of the selection game for the player, resume the selection game at the point at which said previous play of the selection game ended.

11. The gaming system of claim 9, wherein the plurality of instructions, when executed by the at least one processor, cause the at least one processor to enable the player to select the designated quantity of selection rounds from a plurality of different quantities of selection rounds, wherein the set of awards associated with the selection game is based on the selected designated quantity of selection rounds.

12. The gaming system of claim 11, wherein a first designated quantity of selection rounds is associated with a more valuable set of awards than a second, greater designated quantity of selection rounds.

13. The gaming system of claim 1, wherein the plurality of instructions, when executed by the at least one processor, cause the at least one processor to display the first set of selections and the second set of selections simultaneously.

14. A method of operating a gaming system, said method comprising:

(a) if a physical item associated with a monetary value is received by an acceptor, causing at least one processor to execute a plurality of instructions stored in at least one memory device to establish a credit balance based at least in part on the monetary value associated with the received physical item;

(b) for a play of a selection game, causing the at least one processor to execute the plurality of instructions to operate with at least one display device to display a first set of a plurality of selections and a second set of a plurality of selections;
(c) causing the at least one processor to execute the plurality of instructions to initiate a selection round;
(d) for said selection round:
(i) if a designated one of the first set of selections remains unpicked, enabling the player to pick one of the displayed selections of the first set of selections;
(ii) if a designated one of the second set of selections remains unpicked, enabling the player to pick one of the displayed selections of the second set of selections; and
(iii) after receiving any player picks:
(A) if the designated one of the first set of selections and the designated one of the second set of selections have both been picked, causing the at least one processor to execute the plurality of instructions to determine one of a set of a plurality of awards associated with the selection game based on a total quantity of initiated selection rounds, operate with the at least one display device to display the determined award, and increase the credit balance based on the determined award; and
(B) if at least one of the designated one of the first set of selections and the designated one of the second set of selections remains unpicked, causing the at least one processor to execute the plurality of instructions to end said selection round and repeating (d) for another selection round; and
(e) if a cashout input is received by a cashout button, causing the at least one processor to execute the plurality of instructions to initiate a payout associated with the credit balance.

15. The method of claim 14, which includes:
(1) causing the at least one processor to execute the plurality of instructions to select one of a plurality of bonus games including the selection game, wherein each of the bonus games is associated with a set of a plurality of awards, the sets of awards associated with at least two of the bonus games are different, and the sets of awards each include at least one same award; and
(2) providing (b) to (d) for said play of the selection game when the selected bonus game is the selection game.

16. The method of claim 14, which includes causing the at least one processor to execute the plurality of instructions to operate with the at least one display device to:
(a) display the first set of selections in a first selection set display area;
(b) display the second set of selections in a second selection set display area; and
(c) remove any picked non-designated selections of the first set of selections from the first selection set display area and any picked non-designated selections of the second set of selections from the second selection set display area.

17. The method of claim 14, which includes causing the at least one processor to execute the plurality of instructions to, for each initiated selection round, provide the player a designated quantity of picks, each of which is usable in said selection round.

18. The method of claim 14, which includes providing an additional award if the designated one of the first set of selections and the designated one of the second set of selections are both picked within a designated quantity of selection rounds.

19. The method of claim 14, which includes providing an additional award if the designated one of the first set of selections and the designated one of the second set of selections are both picked within a same selection round.

20. The method of claim 14, which includes providing an additional award opportunity if the designated one of the first set of selections and the designated one of the second set of selections are both picked within a designated quantity of selection rounds.

21. The method of claim 20, wherein the additional award opportunity is another play of the selection game.

22. The method of claim 14, which includes causing the at least one processor to execute the plurality of instructions to provide the selection game for a designated quantity of selection rounds.

23. The method of claim 22, which includes causing the at least one processor to execute the plurality of instructions to:
(a) if the designated one of the first set of selections and the designated one of the second set of selections are not picked within the designated quantity of selection rounds, end said play of the selection game; and
(b) for a subsequent play of the selection game for the player, resume the selection game at the point at which said previous play of the selection game ended.

24. The method of claim 22, which includes enabling the player to select the designated quantity of selection rounds from a plurality of different quantities of selection rounds, wherein the set of awards associated with the selection game is based on the selected designated quantity of selection rounds.

25. The method of claim 24, wherein a first designated quantity of selection rounds is associated with a more valuable set of awards than a second, greater designated quantity of selection rounds.

26. The method of claim 14, which includes causing the at least one processor execute the plurality of instructions to operate with the at least one display device to display the first set of selections and the second set of selections simultaneously.

27. The method of claim 14, which is provided through a data network.

28. The method of claim 27, wherein the data network is an internet.

29. A non-transitory computer readable medium storing a plurality of instructions which, when executed by at least one processor, cause the at least one processor to:
(a) following receipt by an acceptor of a physical item associated with a monetary value, establish a credit balance based at least in part on the monetary value associated with the received physical item;
(b) for a play of a selection game, cause at least one display device to display a first set of a plurality of selections and a second set of a plurality of selections;
(c) initiate a selection round;
(d) for said selection round:
(i) if a designated one of the first set of selections remains unpicked, enable the player to pick one of the displayed selections of the first set of selections;
(ii) if a designated one of the second set of selections remains unpicked, enable the player to pick one of the displayed selections of the second set of selections; and (iii) after receiving any player picks:

(A) if the designated one of the first set of selections and the designated one of the second set of selections have both been picked, determine one of a set of a plurality of awards associated with the selection game based on a total quantity of initiated selection rounds, cause the at least one display device to display the determined award, and increase the credit balance based on the determined award; and (B) if at least one of the designated one of the first set of selections and the designated one of the second set of selections remains unpicked, end said selection round and repeat (d) for another selection round; and (e) if a cashout input is received by a cashout button, initiate a payout associated with the credit balance.

30. The non-transitory computer readable medium of claim 29, wherein the plurality of instructions, when executed by the at least one processor, cause the at last one processor to, upon an occurrence of a bonus triggering event:

(1) select one of a plurality of bonus games including the selection game, wherein each of the bonus games is associated with a set of a plurality of awards, the sets of awards associated with at least two of the bonus games are different, and the sets of awards each include at least one same award; and (2) provide (b) to (d) for said play of the selection game when the selected bonus game is the selection game.

31. The non-transitory computer readable medium of claim 29, wherein the plurality of instructions, when executed by the at least one processor, cause the at least one processor to cause the at least one display device to:

(a) display the first set of selections in a first selection set display area;

(b) display the second set of selections in a second selection set display area; and (c) remove any picked non-designated selections of the first set of selections from the first selection set display area and any picked non-designated selections of the second set of selections from the second selection set display area.

32. The non-transitory computer readable medium of claim 29, wherein the plurality of instructions, when executed by the at least one processor, cause the at least one processor to, for each initiated selection round, provide the player a designated quantity of picks, each of which is usable in said selection round.

33. The non-transitory computer readable medium of claim 29, wherein the plurality of instructions, when executed by the at least one processor, cause the at least one processor to provide an additional award if the designated one of the first set of selections and the designated one of the second set of selections are both picked within a designated quantity of selection rounds.

34. The non-transitory computer readable medium of claim 29, wherein the plurality of instructions, when executed by the at least one processor, cause the at least one processor to provide an additional award if the designated one of the first set of selections and the designated one of the second set of selections are both picked within a same selection round.

35. The non-transitory computer readable medium of claim 29, wherein the plurality of instructions, when executed by the at least one processor, cause the at least one processor to provide an additional award opportunity if the designated one of the first set of selections and the designated one of the second set of selections are both picked within a designated quantity of selection rounds.

36. The non-transitory computer readable medium of claim 35, wherein the additional award opportunity is another play of the selection game.

37. The non-transitory computer readable medium of claim 29, wherein the plurality of instructions, when executed by the at least one processor, cause the at least one processor to provide the selection game for a designated quantity of selection rounds.

38. The non-transitory computer readable medium of claim 37, wherein the plurality of instructions, when executed by the at least one processor, cause the at least one processor to:

(a) if the designated one of the first set of selections and the designated one of the second set of selections are not picked within the designated quantity of selection rounds, end said play of the selection game; and (b) for a subsequent play of the selection game for the player, resume the selection game at the point at which said previous play of the selection game ended.

39. The non-transitory computer readable medium of claim 37, wherein the plurality of instructions, when executed by the at least one processor, cause the at least one processor to enable the player to select the designated quantity of selection rounds from a plurality of different quantities of selection rounds, wherein the set of awards associated with the selection game is based on the selected designated quantity of selection rounds.

40. The non-transitory computer readable medium of claim 39, wherein a first designated quantity of selection rounds is associated with a more valuable set of awards than a second, greater designated quantity of selection rounds.

41. The non-transitory computer readable medium of claim 29, wherein the plurality of instructions, when executed by the at least one processor, cause the at least one processor to cause the at least one display device to display the first set of selections and the second set of selections simultaneously.

* * * * *